(12) United States Patent
Zitzmann et al.

(10) Patent No.: US 9,514,500 B2
(45) Date of Patent: Dec. 6, 2016

(54) WATERMARK GENERATOR, WATERMARK DECODER, METHOD FOR PROVIDING A WATERMARKED SIGNAL BASED ON DISCRETE VALUED DATA AND METHOD FOR PROVIDING DISCRETE VALUED DATA IN DEPENDENCE ON A WATERMARKED SIGNAL

(71) Applicant: Fraunhofer-Gesellschaft zur Foerderung der angewandten Forschung e.V., Munich (DE)

(72) Inventors: Reinhard Zitzmann, Baiersdorf (DE); Giovanni Del Galdo, Fuerth (DE); Tobias Bliem, Erlangen (DE); Juliane Borsum, Erlangen (DE); Bert Greevenbosch, Rotterdam (NL); Stefan Kraegeloh, Erlangen (DE); Joerg Pickel, Happurg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 429 days.

(21) Appl. No.: 13/848,507

(22) Filed: Mar. 21, 2013

(65) Prior Publication Data
US 2013/0216090 A1  Aug. 22, 2013

Related U.S. Application Data

(63) Continuation of application No. PCT/EP2011/066118, filed on Sep. 16, 2011.

(30) Foreign Application Priority Data

Sep. 21, 2010 (EP) .................................. 10178035

(51) Int. Cl.
*H04L 9/32* (2006.01)
*G06T 1/00* (2006.01)
(Continued)

(52) U.S. Cl.
CPC ........... *G06T 1/0021* (2013.01); *G10L 19/018* (2013.01); *H04N 1/32144* (2013.01); *H04N 21/8358* (2013.01)

(58) Field of Classification Search
CPC ..................... H04N 21/8358; H04N 1/32144
(Continued)

(56) References Cited

U.S. PATENT DOCUMENTS 6,061,793 A   5/2000  Tewfik et al.
6,584,138 B1  6/2003  Neubauer et al.
(Continued)

FOREIGN PATENT DOCUMENTS

CA   2790648      9/2011
CN   101185122    6/2006
(Continued)

OTHER PUBLICATIONS

Arnold, Michael et al., "A Phase Modulation Audio Watermarking Technique", Springer-Verlag Berlin Heidelberg, IH, LNCS 5806, 2009, pp. 102-116.
(Continued)

*Primary Examiner* — Aravind Moorthy
(74) *Attorney, Agent, or Firm* — Perkins Coie LLP; Michael A. Glenn

(57) ABSTRACT

A watermark generator for providing a watermark signal as a sequence of subsequent watermark coefficients based on a stream of subsequent stream values representing discrete valued data includes a differential encoder. The differential encoder is configured to apply a phase rotation to a current stream value of the stream values representing the discrete
(Continued)

valued data or to a current watermark symbol, the current watermark symbol corresponding to a current stream value of the stream values representing the discrete valued data, to obtain a current watermark coefficient of the watermark signal. The differential encoder is configured to derive a phase of a previous spectral coefficient of a watermarked signal which is a combination of the host signal and the watermark signal, and to provide the watermark signal such that a phase angle of the phase rotation applied to the current stream value or the current watermark symbol is dependent on the phase of the previous spectral coefficient of the watermarked signal.

14 Claims, 15 Drawing Sheets

(51) Int. Cl.
    *H04N 1/32*           (2006.01)
    *H04N 21/8358*    (2011.01)
    *G10L 19/018*     (2013.01)

(58) Field of Classification Search
    USPC .......................................... 380/255; 713/176
    See application file for complete search history.

(56) References Cited

U.S. PATENT DOCUMENTS

| | | | |
|---|---|---|---|
| 2004/0190749 A1* | 9/2004 | Xu et al. | 382/100 |
| 2006/0147308 A1 | 7/2006 | Wobben | |
| 2009/0060258 A1* | 3/2009 | Wang et al. | 382/100 |

FOREIGN PATENT DOCUMENTS

| | | |
|---|---|---|
| CN | 1932879 | 3/2007 |
| CN | 101079147 | 11/2007 |
| CN | 101441870 | 5/2009 |
| EP | 1924989 B1 | 11/2009 |
| EP | 2180180 | 4/2010 |
| EP | 2362387 | 8/2011 |
| EP | 10154964 | 8/2011 |
| JP | 10210092 | 8/1998 |
| JP | 11110913 | 4/1999 |
| JP | 2007535699 | 6/2007 |
| JP | 2010039439 A | 2/2010 |
| KR | 1020070015174 A | 2/2007 |
| KR | 1020070015182 A | 2/2007 |
| RU | 2239243 C2 | 10/2004 |
| RU | 2298295 C2 | 4/2007 |
| WO | WO-9960514 | 11/1999 |
| WO | WO-03053064 | 6/2003 |
| WO | WO-2006129293 | 12/2006 |

OTHER PUBLICATIONS

Bender, W., "Techniques for Data Hiding", IBM Systems Journal, vol. 35, Nos. 3&4, 1996, pp. 313-336.
Chen, Brian et al., "Quantization Index Modulation Methods for Digital Watermarking and Information Embedding of Multimedia", Journal of VLSI Signal Processing, vol. 27, 2001, pp. 7-33.
Chen, Brian et al., "Quantization Index Modulation: A Class of Provably Good Methods for Digital Watermarking and Information Embedding", IEEE Transaction on Information Theory, vol. 47, No. 4, May 2001, 1423-1443.
Cox, Ingemar J. et al., "Digital Watermarking and Steganography, The Morgan Kaufmann Series in Multimedia Information and Systems", Morgan Kaufmann Article, 2008, 587 pp.
Kuo, Shyh-Shiaw et al., "Covert Audio Watermarking Using Perceptually Tuned Signal Independent Multiband Phase Modulation", IEEE International Conference on Acoustics, Speech, and Signal Processing, (ICASSP), vol. 2, 2002, Sep. 2, 2005, pp. 1753-1756.
Ourique, Fabrico et al., "Angle QIM: A Novel Watermark Embedding Scheme Robust Against Amplitude Scaling Distortions", IEEE International Conference on Acoustics, Speech, and Signal Processing (ICASSP) Mar. 2005, Jul. 5, 2005, pp. 797-800.
Swanson, Mitchell D. et al., "Data Hiding for Video-in-Video", IEEE International Conference on Image Processing, vol. 2, 1997, Jul. 1997, pp. 676-679.
Chen, Wen-Yuan, "Color Image Steganography Scheme Using DFT, SPIHT codec, and Modified Differential Phase-Shift Keying Techniques", Applied Mathematics and Computation, Elsevier, US, vol. 196, No. 1, Jan. 14, 2008, pp. 40-54, Jan. 14, 2008, 40-54.

\* cited by examiner

WATERMARK GENERATOR, WATERMARK DECODER, METHOD FOR PROVIDING A WATERMARKED SIGNAL BASED ON DISCRETE VALUED DATA AND METHOD FOR PROVIDING DISCRETE VALUED DATA IN DEPENDENCE ON A WATERMARKED SIGNAL

CROSS-REFERENCE TO RELATED APPLICATIONS

This application is a continuation of copending International Application No. PCT/EP2011/066118, filed Sep. 16, 2011, which is incorporated herein by reference in its entirety, and additionally claims priority from European Application No. 10178035.1, filed Sep. 21, 2010, which is also incorporated herein by reference in its entirety.

Embodiments according to the present invention are related to a watermark generator for providing a watermark signal based on discrete valued data. Further embodiments according to the present invention relate to a watermark decoder for providing discrete valued data in dependence on a watermarked signal. Further embodiments according to the present invention are related to a method for providing a watermark signal based on discrete valued data. Further embodiments according to the present invention are related to a method for providing discrete valued data in dependence on a watermarked signal. Further embodiments are related to corresponding computer programs.

BACKGROUND OF THE INVENTION

In the following different watermarking systems shall be reviewed in short.

A watermarking system can be viewed as a communication system. Let the bit-wise information to be transmitted be represented by a watermark signal "wm", which is the desired signal. The signal wm is 'embedded' into a host signal "a" by adding the two signals (the watermark signal wm and the host signal a), obtaining a watermarked signal "awm". With respect to the watermark, the host signal can be seen as an additive distortion. This means that awm deviates from its ideal value wm, corrupting the decoding process (if the original host signal a is not known at the decoder). The signal awm is further affected by a transmission channel, in that the channel introduces distortions. Examples of transmission channels are the compression of the signal awm with an audio codec such as AAC as well as the playback of the signal awm with a loudspeaker, its propagation in air, and its pickup with a microphone.

A characteristic of watermark systems is that one part of the distortion, namely the host signal, is known at the transmitter. If this information is exploited during embedding the method is called informed embedding or watermarking with side information (see also Ingemar J. Cox, Ed., Digital watermarking and steganography, The Morgan Kaufmann series in multimedia information and systems. Morgan Kaufmann, Burlington, 2. ed. edition, 2008). In principle, weighting the watermark wm according to power levels given by a perceptual model is already a case of informed embedding. However, this information is used merely to scale the watermark in order to make it imperceptible whereas the host signal is still seen as an unknown noise source for the generation of the watermark prior to the weighting. In certain cases, it is possible to create the watermark signal in a way that compensates for the host signal induced distortion so that only channel-induced distortion corrupts the decoding. Such methods are called host-interference rejecting methods (see also Chen and Worrell, "Quantization index modulation: A class of provably good methods for digital watermarking and information embedding," IEEE TRANSACTION ON INFORMATION THEORY, May 2001, vol. VOL. 47).

In EP non pre-published 10154964.0-1224 differential encoding has been introduced in combination with BPSK- (binary phase shift keying) signaling to obtain a system which is robust with respect to movement of the decoding device (for example if the signal is picked up by a microphone), potential frequency mismatch between the local oscillators in the transmit (Tx) and receive (Rx) sides and potential phase rotations introduced by a frequency selective channel, such as the propagation in the reverberant environment.

The robustness comes from the fact that the information is coded in the phase difference between two adjacent symbols, so that the system is virtually unaffected by a slowly drifting phase rotation of the modulation constellation.

Although the method described in EP 10154964.0-1224 uses information about the host signal a by scaling the watermark signal wm in order to make it imperceptible, the host signal a is still an additional source of unknown noise from the communication system's perspective. In other words, the watermark signal wm (prior to the perceptually motivated scaling) is generated regardless of any knowledge of the host signal a.

Several watermarking systems use some kind of informed embedding method but only a few belong to the group of host-interference rejecting methods. Examples of these are low-bit modulation (LBM) (Mitchell D. Swanson; Bin Zhu; Ahmed H. Tewfik, "Data hiding for video-in-video," IEEE International Conference on Image Processing, 1997, vol. 2, pp. 676-679; Brian Chen and Gregory W. Women, "Quantization index modulation methods for digital watermarking and information embedding of multimedia," Journal of VLSI Signal Processing, vol. 27, pp. 7-33, 2001) and quantization index modulation (QIM) that was introduced in (Chen and Wornell, "Quantization index modulation: A class of provably good methods for digital watermarking and information embedding," IEEE TRANSACTION ON INFORMATION THEORY, May 2001, vol. VOL. 47, and Brian Chen and Gregory Wornell, "System, method, and product for information embedding using an ensemble of non-intersecting embedding generators," 1999, WO99/60514A).

In QIM, it is first necessitated to choose one or more parameters of a signal representation, e.g., the complex coefficients of a time-frequency representation. The parameters chosen are then quantized according to information to be embedded. In fact, each information-carrying symbol is linked with a certain quantizer; alternatively a whole message is linked with a sequence of quantizers. Depending on the information to be transmitted, the signal is quantized with the quantizer or sequence of quantizers associated with the information. For instance, if the parameter to be quantized was a positive real number, the quantizer to be used to embed a 0 could be defined by the quantization steps 0, 2, 4, 6, . . . whereas the quantizer for a 1 could be 1, 3, 5, . . . . If the current value of the host signal was 4.6 the embedder would change the value to 4 in case of a bit 0 and to 5 in case of a 1. At the receiver, the distance between the received signal representation and all possible quantized representations is calculated. The decision is made according to the minimum distance. In other words, the receiver attempts to identify which of the available quantizers has been used. By doing so, host-interference rejection can be achieved.

Of course, quantizing certain signal parameters may introduce perceivable distortion to the host signal. In order to prevent this the quantization error may be partly added back to the signal which is referred to as distortion-compensated QIM (DC-QIM) (see also Antonius Kalker, "Quantization index modulation (QIM) digital watermarking of multimedia signals," 2001, WO03/053064). This is an additional source of distortion at the receiver. Although it has been shown that DC-QIM is optimal for the AWGN (additive white Gaussian noise) channel and regular QIM is near-optimal (see also Chen and Wornell, "Quantization index modulation: A class of provably good methods for digital watermarking and information embedding," IEEE TRANSACTION ON INFORMATION THEORY, May 2001, vol. VOL. 47) the methods have certain drawbacks. They allow for high bit rates but are especially sensitive to amplitude scaling attacks (see also Fabricio Ourique; Vinicius Licks; Ramiro Jordan; Fernando Perez-Gonzalez, "Angle qim: A novel watermark embedding scheme robust against amplitude scaling distortions," IEEE International Conference on Acoustics, Speech, and Signal Processing (ICASSP), March 2005).

Another method (derived from QIM) is named Angle QIM (AQIM) and was proposed in the article of Fabricio Ourique; Vinicius Licks; Ramiro Jordan; Fernando Perez-Gonzalez, "Angle qim: A novel watermark embedding scheme robust against amplitude scaling distortions," IEEE International Conference on Acoustics, Speech, and Signal Processing (ICASSP), March 2005. There the information is embedded via the quantized angular coordinates. By doing so, robustness against amplitude scaling can be achieved. This method does not provide differential modulation and is therefore not robust against phase drift.

Other watermarking systems exist where the information is embedded into the phase of the audio signal. The methods presented in the article of W. Bender, D. Gruhl, N. Morimoto, and Aiguo Lu, "Techniques for data hiding," IBM Syst. J., vol. 35, no. 3-4, pp. 313-336, 1996 and S. Kuo, J. D. Johnston, W. Turin, and S. R. Quackenbush, "Covert audio watermarking using perceptually tuned signal independent multiband phase modulation," IEEE International Conference on Acoustics, Speech, and Signal Processing, (ICASSP), 2002, vol. 2, pp. 1753-1756 are non-blind methods and therefore limited to only a small number of applications. In the article of Michael Arnold, Peter G. Baum, and Walter Voesing, "A phase modulation audio watermarking technique," pp. 102-116, 2009, a blind phase modulation audio watermarking technique is proposed which is called Adaptive Spread Phase Modulation (ASPM). Additionally, these phase modulation methods do not have the host-interference rejection property and do not take the differential coding into account.

Many more watermarking methods exist, including spread spectrum or echo-hiding methods. But as already stated in EP 10154964.0-1224 these methods may not be applicable to certain tasks of interest, e.g. transmitting a watermark over an acoustic path in a reverberant environment.

SUMMARY

According to an embodiment, a watermark generator for providing a watermark signal as a sequence of subsequent watermark coefficients based on a stream of subsequent stream values representing discrete valued data may have: a differential encoder configured to provide the watermark signal, wherein the differential encoder is configured to apply a phase rotation to a current stream value of the stream values representing the discrete valued data or to a current watermark symbol, the current watermark symbol corresponding to a current stream value of the stream values representing the discrete valued data, to obtain a current watermark coefficient of the watermark signal; wherein the differential encoder is configured to derive a phase of a previous spectral coefficient of a watermarked signal which is a combination of a host signal and the watermark signal; wherein the differential encoder is configured to provide the watermark signal such that a phase angle of the phase rotation applied to the current stream value or the current watermark symbol is dependent on the phase of the previous spectral coefficient of the watermarked signal; and wherein the host signal is an audio signal, an image signal or a video signal, and the watermarked signal is an audio signal, an image signal or a video signal.

According to another embodiment, a watermark decoder for providing discrete valued data in dependence on a watermarked signal may have: an information processor to provide a stream of complex valued spectral coefficients, the stream representing the watermarked signal; and a differential decoder configured to determine a phase angle difference between a previous complex valued spectral coefficient and a current complex valued spectral coefficient, configured to map phase angle differences within at least two different phase angle ranges to a first discrete value of the discrete-valued data and to map phase angle differences within at least another two different phase angle ranges to a second discrete value of the discrete valued data; wherein the differential decoder is configured to distinguish at least between four different phase angle ranges, and wherein the differential decoder is configured to map adjacent phase angle ranges to different discrete values of the discrete-valued data; and wherein the watermarked signal is an audio signal, an image signal or a video signal.

According to another embodiment, a method for providing a watermark signal as a sequence of subsequent watermark coefficients based on discrete-valued data may have the steps of providing, in dependence on information units of the discrete-valued data, a stream of subsequent stream values such that the stream represents the discrete-valued data; applying a phase rotation to a current stream value of the stream values representing the discrete valued data or to a current watermark symbol, the current watermark symbol corresponding to a current stream value of the stream values representing the discrete valued data, to obtain a current watermark coefficient of the watermark signal; deriving a phase of a previous spectral coefficient of a watermarked signal which is a combination of a host signal and the watermark signal; and providing the watermark signal such that a phase angle of the phase rotation applied to the current stream value or to the current watermark symbol is dependent on the phase of the previous spectral coefficient of the watermarked signal; wherein the host signal is an audio signal, an image signal or a video signal, and the watermarked signal is an audio signal, an image signal or a video signal.

According to another embodiment, a method for providing discrete-valued data in dependence on a watermarked signal may have the steps of: providing a stream of complex-valued spectral coefficients, the stream representing the watermarked signal; determining a phase angle difference between a previous complex valued spectral coefficient and a current complex-valued spectral coefficient; mapping phase angle differences within at least two different phase angle ranges to a first discrete value of the discrete-valued data and mapping phase angle differences within at least another two different phase angle ranges to a second discrete value of the discrete valued data; wherein adjacent phase angle ranges are mapped to different discrete values of the discrete-valued data; and wherein the watermarked signal is an audio signal, an image signal or a video signal.

Another embodiment may have a computer program for performing the inventive method, when the computer program runs on a computer.

An embodiment according to the present invention creates a watermark generator for providing a watermark signal as a sequence of subsequent watermark coefficients based on discrete valued data. The watermark generator optionally comprises an information processor configured to provide, in dependence on information units of the discrete valued data, a stream of subsequent stream values, such that the stream represents the discrete valued data. The watermark generator further comprises a differential encoder configured to provide the watermark signal. The differential encoder is further configured to apply a phase rotation to a current stream value of the stream values representing the discrete valued data or to a current watermark symbol, the current watermark symbol corresponding to a current stream value of the stream values representing the discrete valued data, to obtain a current watermark coefficient of the watermark signal. The differential encoder is further configured to derive a phase of a previous spectral coefficient of a watermarked signal which is a combination of a host signal and the watermark signal. The differential encoder is further configured to provide the watermark signal such that a phase angle of the phase rotation applied to the current stream value or the current watermark symbol is dependent on the phase of the previous spectral coefficient of the watermarked signal.

It is an idea of the present invention that a watermark signal is more robust, especially with respect to a degradation, for example, by Doppler effect, if a differential encoding of a watermark coefficients is performed such that a phase of a current watermark coefficient is based on a phase of a previous spectral coefficient of a watermarked signal which is to be embedded in a host signal. Embodiments of the present invention combine host interference rejection with differential encoding. This concept of deriving the phase of the current watermark coefficient based on the phase of a previous spectral coefficient of the watermarked signal reduces the distortion induced by the host signal and thus improves a decoding process, for example at a decoder being configured to extract the watermark signal out of the watermarked signal.

In an embodiment of the present invention the information processor may be configured to provide the stream representing the discrete valued data in a time frequency domain, such that each stream value of the stream is associated to a frequency subchannel with a center frequency and a time slot. The differential encoder may be configured to obtain the current watermark coefficient in the time frequency domain, such that a frequency subchannel associated to the current watermark coefficient is identical to a frequency subchannel associated to the current stream value and such that a time slot associated to the current watermark coefficient is identical to a time slot associated to the current stream value. In other words, the current stream value and the current watermark coefficient which corresponds to the current stream value may be associated to the same frequency subchannel and time slot.

The information processor may for example perform a time spreading and a frequency spreading of the information units of the discrete valued data, such that every information unit of the discrete valued data is represented by at least two different stream values of the stream representing the discrete valued data, wherein different stream values representing the same information unit differ in their associated frequency subchannels and/or time slots.

Furthermore, the differential encoder may be configured to derive the spectral coefficients of the watermarked signal in a time frequency domain such that each spectral coefficient of the watermarked signal corresponds to a frequency subchannel and a time slot. The differential encoder may further be configured to determine the phase rotation, such that a time slot associated to the previous spectral coefficient of the watermarked signal, in dependence on which the phase angle of the phase rotation applied to the current stream value or the current watermark symbol is chosen, and the time slot associated to the current stream value are adjacent in time. The watermarked signal may for example be a sequence of subsequent spectral coefficients and a current spectral coefficient of the watermarked signal may be adjacent in time to (or may follow) the previous spectral coefficient of the watermarked signal. Each spectral coefficient of the watermarked signal may be a combination of a spectral coefficient of the host signal associated to the same frequency subchannel and time slot like the spectral coefficient of the watermarked signal and of a watermark coefficient associated to the same frequency subchannel and time slot like the spectral coefficient of the watermarked signal. The current spectral coefficient of the watermarked signal may therefore be based on a current coefficient of the host signal and the current watermark coefficient, wherein the phase of the current watermark coefficient is based on (or is in some cases even identical to) the phase of the previous spectral coefficient of the watermarked signal. The frequency subchannel associated to the previous spectral coefficient of the watermarked signal may be identical to the frequency subchannel of the current spectral coefficient of the watermarked signal and therefore also to the frequency subchannels of the current coefficient of the host signal, of the current stream value and of the current watermark coefficient.

BRIEF DESCRIPTION OF THE DRAWINGS

Embodiments of the present invention will be detailed subsequently referring to the appended drawings, in which:

FIG. 8b shows a diagram as an example for the embedding principle of the watermark generator from FIG. 8a;

DETAILED DESCRIPTION OF THE INVENTION

Figure 1:
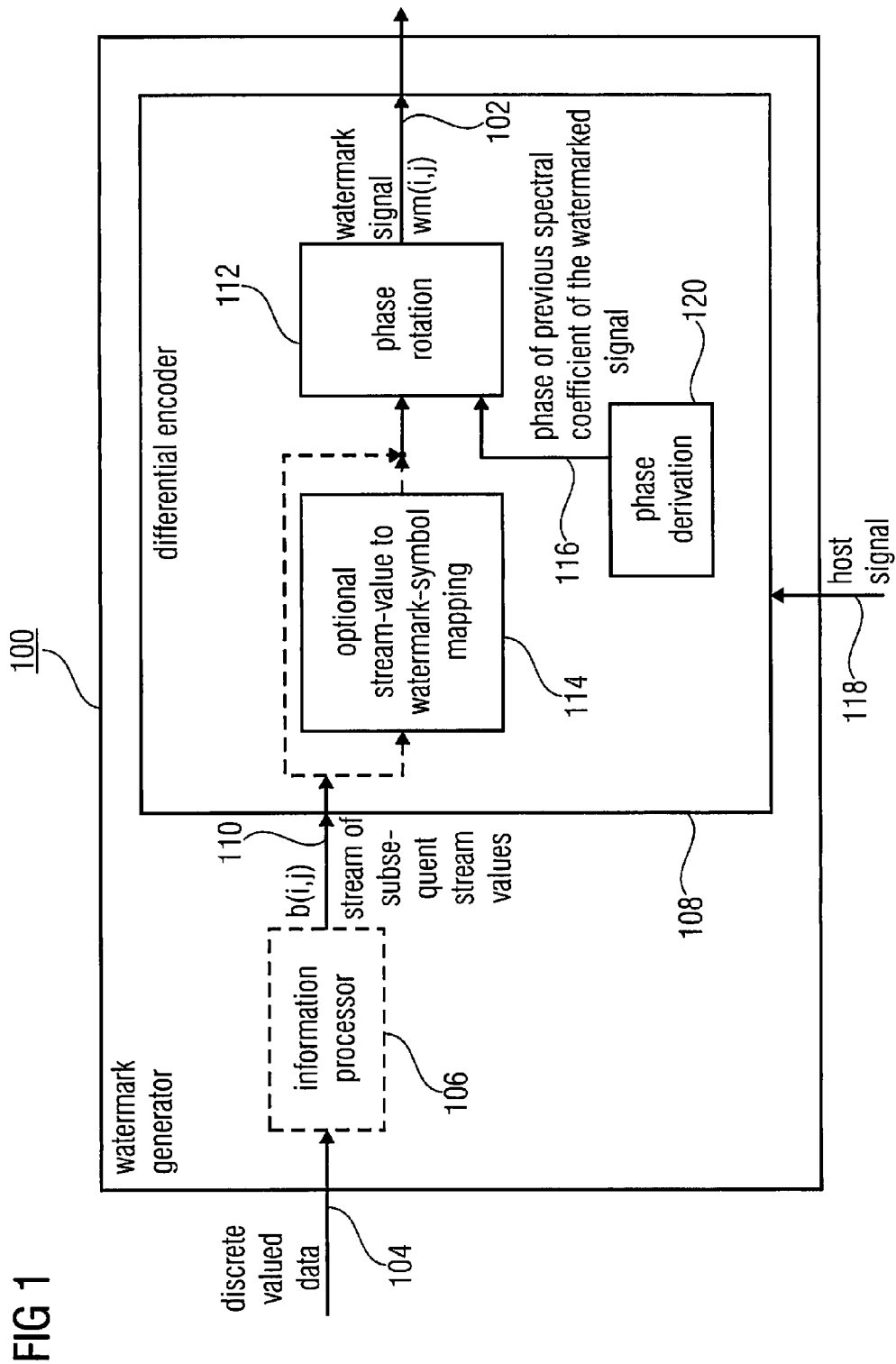
FIG. 1 shows a block schematic diagram of a watermark generator, according to an embodiment of the present invention.

Before embodiments of the present invention are explained in greater detail, taking reference to the accompanying figures, it is to be pointed out that the same or functionally equal elements are provided with the same reference numbers and that a repeated description of these elements shall be omitted. Descriptions of elements provided with the same reference numerals are therefore mutually interchangeable.

Watermark Generator According to FIG. 1

In the following, a watermark generator 100 will be described taking reference to FIG. 1, which shows the block schematic diagram of such a watermark generator. The watermark generator 100 is configured to provide a watermark signal 102, also designated as "wm", as a sequence of subsequent watermark coefficients. The watermark generator comprises an optional information processor 106 and a differential encoder 108. The information processor 106 is configured to provide, in dependence on information units (for example bits) of the discrete valued data 104 (for example binary data), a first stream 110 of subsequent stream values, such that the stream 110 represents the discrete valued data 104. The differential encoder 108 is configured to provide the watermark signal 102 and to apply a phase rotation 112 to a current stream value (for example, a stream value b(i, j)) of the stream values representing the discrete valued data 104 or to a current watermark symbol (for example, a watermark symbol $x_k(i, j)$) corresponding to a current stream value (for example, to the stream value b(i, j)) of the stream values representing the discrete valued data 104, to obtain a current watermark coefficient (for example a watermark coefficient wm(i, j)) of the watermark signal 102.

The differential encoder 108 may therefore perform an optional stream value to watermark symbol mapping 114.

The differential encoder 108 is further configured to derive a phase 116 of a spectral coefficient (for example a spectral coefficient awm(i, j−1)) of a watermarked signal. The watermarked signal is a combination of a host signal 118 and the watermark signal 102. The watermarked signal may also be designated as "awm" and the host signal may also be designated as "a".

The differential encoder 108 is configured to provide the watermark signal 102 such that a phase angle of the phase rotation 112 applied to the current stream value or the current watermark symbol is dependent on the phase 116 of the previous spectral coefficient of the watermarked signal. In an embodiment of the present invention, the phase angle of the phase rotation 112 applied to the current stream value or the current watermark symbol is equal to the phase angle of the previous spectral coefficient of the watermarked signal To derive the phase 116 of the previous spectral coefficient of the watermarked signal the differential encoder 108 may perform a phase derivation 120 on the previous spectral coefficient of the watermarked signal. The previous spectral coefficient may, for example, be provided from a stage which is external to the watermark generator 100, or the differential encoder 108 may be configured to determine spectral coefficients of the watermarked signal by combining watermark coefficients and spectral coefficients of the host signal 118. For example, the differential encoder 108 may be configured to derive the previous spectral coefficient of the watermarked signal based on a combination of a previous watermark coefficient (for example a watermark coefficient wm(i, j−1)) and a previous spectral coefficient, for example a spectral coefficient a(i, j−1)) of the host signal 118. In other words, the differential encoder may not only derive watermark coefficients but also spectral coefficients of the watermarked signal.

The information processor 106 may be configured to provide the first stream 110 representing the discrete valued data 104 in a time frequency domain, such that each stream value of the stream 110 is associated to a frequency subchannel and a time slot.

The index "i" used above may indicate the frequency subchannel and the index "j" may indicate the "symbol number" or, in other words, the time slot of the corresponding coefficient or symbol. In other words "i" denotes a frequency subchannel (at center frequency $f_i$) and "j" denotes the temporal index or the time slot of the value corresponding to it.

Therefore each stream value of the stream 110 is associated to a frequency subchannel i and a time slot j. Furthermore, the differential encoder 108 may be configured to obtain the current watermark coefficient wm(i, j) in the time frequency domain, such that a frequency subchannel i associated to the current watermark coefficient wm(i, j) is identical to a frequency subchannel i associated to the current stream value b(i, j) and such that a time slot j associated to the current watermark coefficient wm(i, j) is identical to a time slot j associated to the current stream value b(i, j).

In other words, a frequency subchannel and a time slot or symbol number of a watermark coefficient of the watermark signal wm, which are associated to a stream value of the stream value of the stream 110, may be identical to the frequency subchannel and time slot or symbol number of the corresponding stream value.

Furthermore, the differential encoder 108 may be configured to derive spectral coefficients of the watermarked signal in a time frequency domain too, such that each spectral coefficient of the watermarked signal is associated to a frequency subchannel and a time slot. The differential encoder 108 may therefore be configured to determine the phase rotation 112 such that a time slot j−1 which is associated to the previous spectral coefficient awm(i, j−1) of the watermarked signal, in dependence on which the phase angle of the phase rotation 112 applied to the current stream value b(i, j) or the current watermark symbol $x_k$(i, j) is chosen, and the time slot j corresponding to the current stream value b(i, j) are adjacent in time. In other words, a current spectral coefficient awm(i, j), which is a combination of the current watermark coefficient wm(i, j) and the current spectral coefficient a(i, j) of the host signal 118, may directly follow the previous spectral coefficient awm(i, j−1) in time when the watermarked signal is viewed as a sequence of subsequent spectral coefficients awm(i, j) (i, j∈N). Furthermore, the differential encoder 108 may be configured such that the frequency subchannels i of the current stream value b(i, j), the current watermark coefficient wm(i, j) and the spectral coefficient awm(i, j) are identical. This means, the differential encoder 108 may perform the watermark signal derivation process for every frequency subchannel onto which the information units of discrete valued data 104 are mapped. This is advantageous because in a reverberant environment different phase rotations to the transmitted signal may be applied to different frequency subchannels. The phase of the current watermark coefficient wm(i, j) may therefore only be based on the previous spectral coefficient awm(i, j−1) of the watermarked signal being associated to the same frequency subchannel i like the current watermark coefficient wm(i, j).

Figure 2:
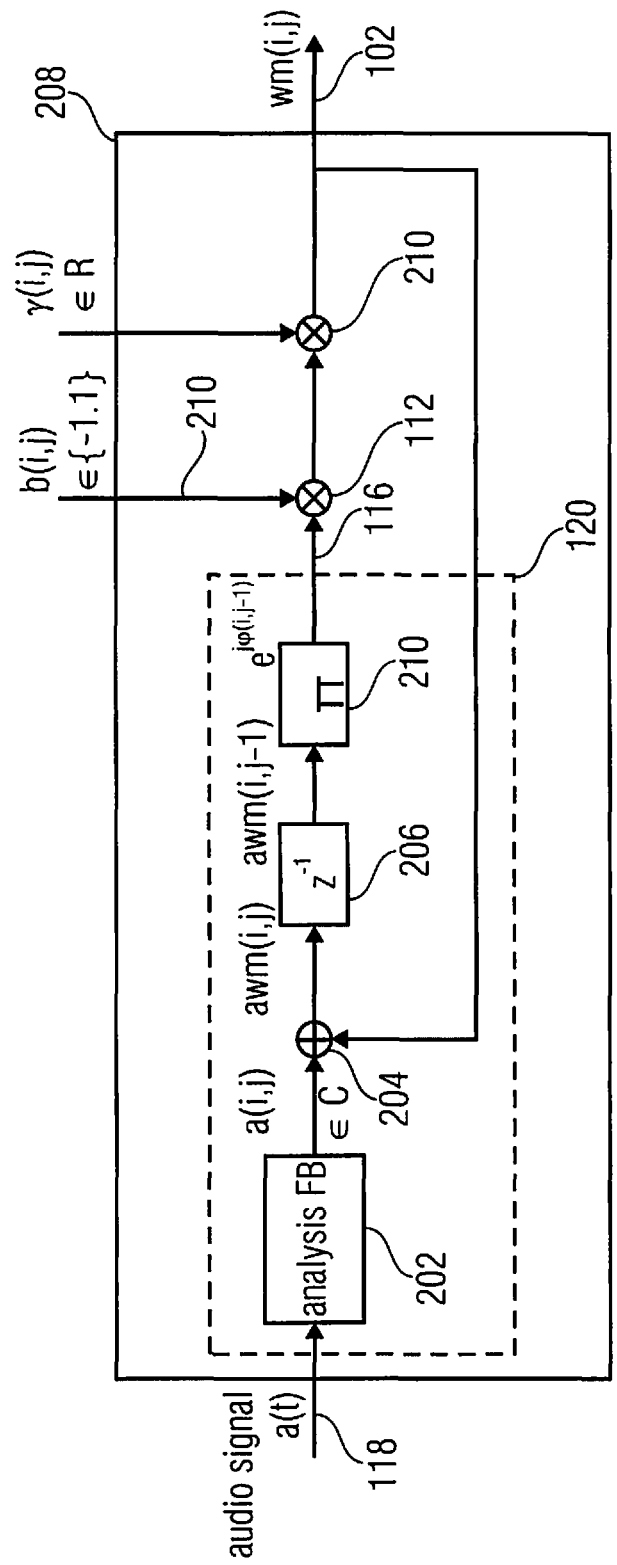
FIG. 2 shows a bock schematic diagram of a differential encoder, for use in an embodiment of the present invention.

Differential Encoder According to FIG. 2 Using a Two-Point Constellation

In the following, a differential encoder 208 for use in a watermark generator according to an embodiment of the present invention shall be explained taking reference to the FIGS. 2, 3a to 3c. In the following, the host signal 118 will be an audio signal and may also be designated as host audio signal in which the watermark signal is to be embedded. Nevertheless, embodiments of the present invention may also be used for embedding watermark signals in other signals than audio signal, for example in video signals. The functionality of the differential encoder 208 may be equivalent to the functionality of the differential encoder 108 and the differential encoder 208 may comprise the further functionalities shown in FIG. 2.

The differential encoder 208 is configured to receive the host signal 118 as a host audio signal a(t) in the time domain. The differential encoder 208 may therefore comprise, as shown in FIG. 2, an analysis filter bank 202 configured to obtain the spectral coefficients (for example the current spectral coefficient a(i, j)) of the host signal 118 in the time frequency domain. This analysis filter bank 202 may also be used in a corresponding watermark decoder. In other words the audio coefficients (the spectral coefficients of the host signal 118) in the encoder may be obtained by applying the same analysis filter bank 202 that is used in a decoder. Obtaining the spectral coefficient of the host signal 118 may be part of the phase derivation 120, which is performed by the differential encoder 208. To obtain the current spectral coefficient awm(i, j) of the watermarked signal the differential encoder 208 may perform, during the phase derivation 120, a combination 204 of the current watermark coefficient wm(i, j) and the current spectral coefficient a(i, j) of the host signal 118, for example according to the following equation:

$$awm(i,j)=a(i,j)+wm(i,j). \quad (1)$$

The obtained current spectral coefficient awm(i, j) of the watermarked signal may be stored in the differential encoder 208 (symbolized by a delay element 206 of the differential encoder 208). The stored current spectral coefficient awm(i, j) of the watermarked signal may then be used to determine a following watermark coefficient wm(i, j+1).

To find the current watermark coefficient wm(i, j) for the frequency subchannel i, the phase 116 of the previous spectral coefficient awm(i, j−1), which is also designated as previous watermarked audio coefficient of the watermarked signal, is calculated, for example, in a phase calculating process 210 of the phase derivation process 120 using the following equation:

$$e^{j\varphi(i,j-1)} = \frac{awm(i, j-1)}{|awm(i, j-1)|} \quad (2)$$

In this application "j" designates the imaginary unit (square root of −1), it should not be mixed up the index j for the time slots.

The phase 116 (represented by the complex value $e^{j\varphi(i,j-1)}$) or the phase angle φ(i, j−1) of the previous spectral coefficient awm(i, j−1) is used by the differential encoder 208 in the phase rotation 112, which is applied to the current stream value b(i, j) of the stream 110. If no phase change is to be transmitted, for example if the current stream value b(i, j) is equal to 1, a phase of the current watermark coefficient wm(i, j) is identical to the phase 116 of the previous spectral coefficient awm(i, j−1) of the watermarked signal, or in other words the current watermark coefficient wm(i, j) points in the same direction as the previous spectral coefficient awm(i, j−1) of the watermarked signal. If a phase change by π(180°) is to be transmitted (for example if the current stream value b(i, j) is −1), the current watermark coefficient wm(i, j) may point in the opposite direction when compared to the previous spectral coefficient awm(i, j−1) of the watermarked signal. The stream values may, for example, be binary data, for example, the stream values may be:

$$b(i,j)=\{-1,1\}. \quad (3)$$

At the beginning of the stream 110, that is for j=0 or if the phase 116 ($e^{j\varphi(i,j)}$) is undefined, the phase 116 or $e^{j\varphi(i,j)}$ may be set equal 1.

The differential encoder 208 may further perform a scaling of the current stream value b(i, j) by a current scaling factor γ(i, j) (i, j∈N, γ∈R) or by a current factor which is smaller than the current scaling factor γ(i, j). The scaling 210 may be applied to the current stream value b(i, j) before applying the phase rotation 112 or after applying the phase rotation 112 (as it is shown in FIG. 2). The current scaling factor γ(i, j) is provided by a psychoacoustical processing module (not shown in FIG. 2) in dependence on the host signal 118, into which the watermark signal 102 is to be embedded. The scaling factor γ(i, j) describes a masking characteristic of the host signal 118. The current scaling factor γ(i, j) may determine a maximum amplitude of the current watermark symbol wm(i, j) such that the current watermark coefficient wm(i, j) stays inaudible in the watermarked signal.

In an embodiment of the present invention the maximum amplitude of the current watermark coefficient wm(i, j) allowed by the psychoacoustical model is used.

The differential encoder 208 may therefore determine the current watermark coefficient wm(i, j) as:

$$wm(i,j)=b(i,j)\cdot\gamma(i,j)\cdot e^{j\varphi(i,j-1)}. \quad (4)$$

By using equation 4, the encoding strategy may get optimal, this means that a signal-to-noise ratio at a decoder after differential decoding can be maximized. From equation 4 it can be seen that a differential encoding is carried out implicitly, so that a signal $b_{diff}(i, j)=b(i, j) \cdot b_{diff}(i, j-1)$, which has to be computed in EP 10154964, does not need to be computed in embodiments of the present invention.

Furthermore, it is to be pointed out that in embodiments of the present invention the phase rotation 112 during differential encoding is introduced, to archive a host interference rejection with an implicit differential encoding, which is a significant advantage, especially when compared to the embedding method stated in EP 10154964.

Figure 3A:
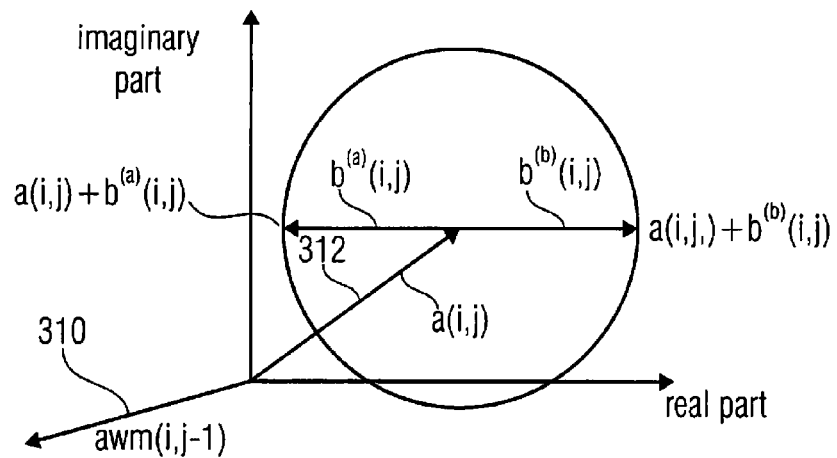
FIGS. 3a to 3c show diagrams of an example for phase rotation and scaling applied in the differential encoder of FIG. 2.
Figure 3B:
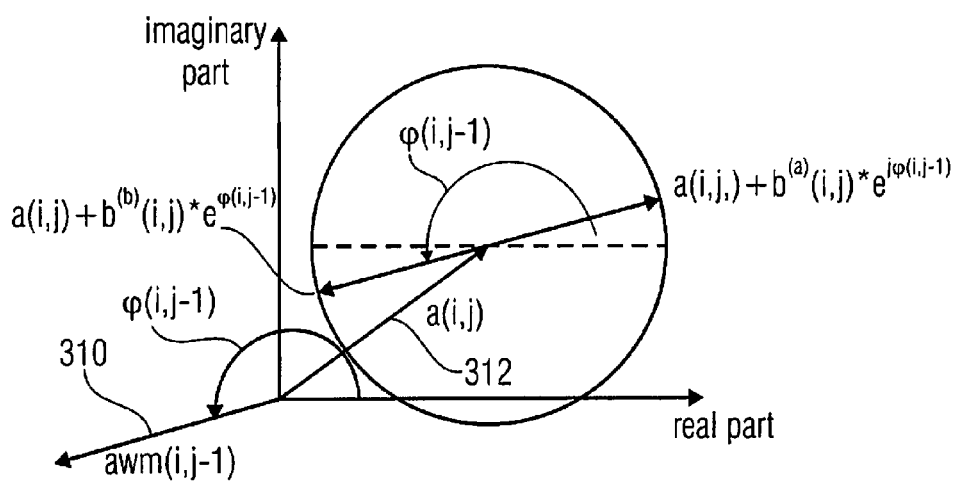
Figure 3C:
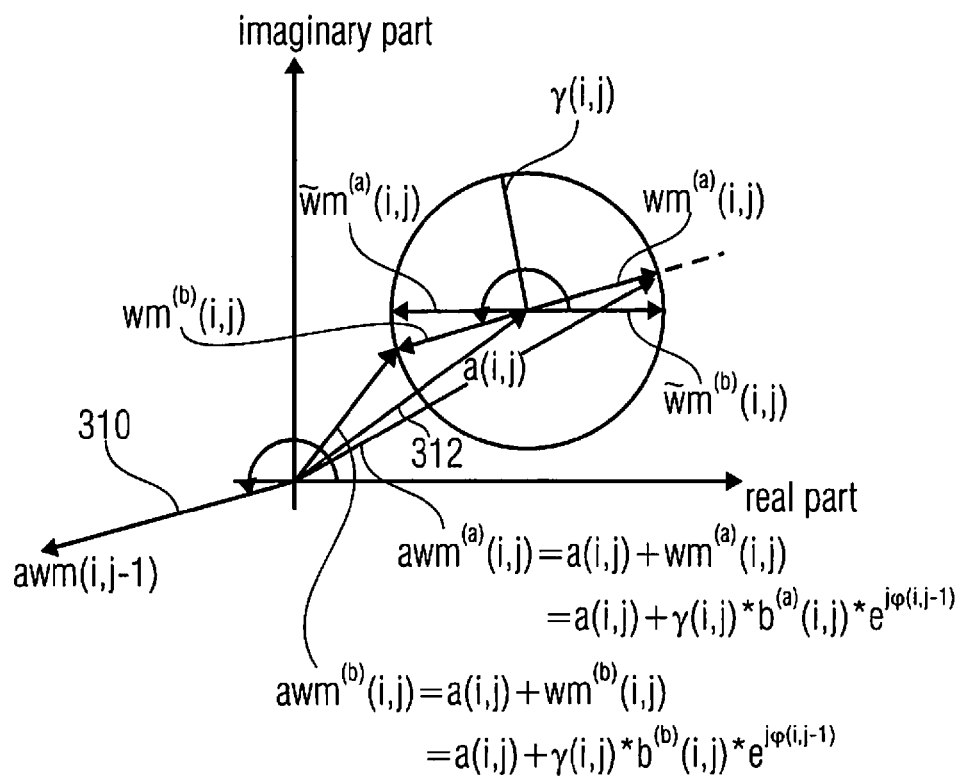

In FIGS. 3a to 3c an example for the embedding process is given.

FIG. 3a shows in a diagram the host signal plus watermark for the previous temporal slot, namely the previous spectral coefficient awm(i, j−1) of the watermarked signal, as a vector 310 in the complex plane. Furthermore, the current spectral coefficient a(i, j) of the host signal 118 is shown as another vector 312 in the complex plane. The current audio signal a(i, j) or the current spectral coefficient a(i, j) of the host signal 118 represents the center of a circle on which the phase rotation 112 can be applied to the current stream value b(i, j). Furthermore, the radius of the circle after scaling the current stream value b(i, j) may delimit some masking region of the host signal 118.

In other words, the radius of the circle may be scaled based on the current scaling factor γ(i, j). As can be seen from FIG. 3a, the current stream value b(i, j) may comprise a phase of 0 or a phase of π, depending on its value. As shown in equation 3, the current stream value b(i, j) may either take the value −1 or +1, this rule may apply if the discrete valued data 104 is binary data, the stream 110 therefore may comprise only binary stream values. The vector $b^{(a)}(i, j)$ may therefore correspond with a first value (for example −1) of the current stream value b(i, j) and the vector $b^{(b)}(i, j)$ may correspond with a complementary value (for example +1) of the current stream value b(i, j).

FIG. 3b shows the circle from FIG. 3a after the phase rotation 112 has been applied to the current stream value b(i, j). It be seen from FIG. 3b, that the phase angle φ(i, j−1) by which the circle from FIG. 3a is rotated is identical to the phase angle φ(i, j−1) of the previous spectral coefficient awm(i, j−1) of the watermarked signal. In other words, the current stream value b(i, j) is phase shifted by the phase 116 of the previous spectral coefficient awm(i, j−1) of the watermarked signal.

FIG. 3c shows the circle from FIG. 3b after scaling 210 of the phase rotated current stream value b(i, j). The circle therefore delimits the masking region. According to embodiments of the present invention the watermark wm(i, j) or the current watermark coefficient wm(i, j) is constructed either as $wm^{(a)}(i, j)$ or as $wm^{(b)}(i, j)$ depending on the current stream value b(i, j). As a comparison example, the possibilities for the traditional method stated in EP 10154964 namely $\tilde{w}m^{(a)}(i, j)$ or $\tilde{w}m^{(b)}(i, j)$ are also shown. It can be seen that for the traditional method the current watermark coefficients $\tilde{w}m^{(a)}(i, j)$ or $\tilde{w}m^{(b)}(i, j)$ are constructed independent on the phase of a previous spectral coefficient of a watermarked signal. In other words, comparing the two strategies it can be observed that embodiments of the present invention rotate the traditional solution by an angle dependent on the previous watermarked signal awm(i, j−1) or the previous spectral coefficient awm(i, j−1) of the watermarked signal.

To summarize, the current spectral coefficient awm(i, j) of the watermarked signal can be obtained by a summation of the current spectral coefficient a(i, j) of the host signal 118 and a rotated (and, optimally, scaled) version of the current stream value b(i, j) such that the current spectral coefficient awm(i, j) lies on or within the circle, the center of which is defined by the current spectral coefficient a(i, j) of the host signal 118, a radius of which is determined by a magnitude of the current stream value b(i, j) and a range of values of the current scaling factor γ(i, j).

This embedding strategy according to embodiments of the present invention reduces the distortion induced by the host signal 118 and thus improves the decoding process at a decoder.

From FIG. 3c it can be seen that the current spectral coefficient awm(i, j) of the watermarked signal can be calculated depending on the current stream value b(i, j) as:

$$awm^{(a)}(i,j)=a(i,j)+wm^{(a)}(i,j) \quad (5)$$

or $$awm^{(b)}(i,j)=a(i,j)+wm^{(b)}(i,j), \quad (6)$$

depending on the value of the current stream value b(i, j).

The current scaling factor γ(i, j) and the phase 116 ($e^{j\phi(i,j-1)}$) of the previous spectral coefficient awm(i, j−1) of the watermarked signal are already included in $wm^{(a)}(i, j)$ and $wm^{(b)}(i, j)$ (see equation 4).

The circle of radius γ(i, j) delimits the area of the complex plane in which the current watermark coefficient wm(i, j), which is expressed as a vector centered in the current spectral coefficient a(i, j) of the host signal 118, can be defined. The current scaling factor γ(i, j) is provided by the psychoacoustical model and ensures that the watermark will be inaudible. To achieve the highest SIR, namely the highest signal to interference (i.e. the host signal 118) ratio, it can be optimal to place the current watermark coefficient wm(i, j) on the circle rather than within it. In other words, it may be optimal to use the maximum allowed power of the watermark coefficients of the watermark signal 102. In other words it may be optimal to use the current scaling factor γ(i, j) provided by the psychoacoustical model for the scaling 210 rather than another (also allowed) scaling factor which is smaller than the current scaling factor γ(i, j).

It has been found that with such a masking circle shown in the FIGS. 3a to 3c not only wm(i, j)=b(i, j)·γ(i, j) with b(i, j)∈{−1, 1} is allowed, but that instead also wm(i, j)=γ(i, j)·$e^{j\theta}$·b(i, j) with θ∈[0, 2π) can also be used. Embodiments of the present invention make use of this finding by applying the phase rotation 112 to the current stream values of the stream 110 based on phases of previous spectral coefficients of the watermarked signal. Other masking regions might also be possible. For example, if investigations showed that phase changes of an audio coefficient (of a spectral coefficient of the host signal 118) are less critical to the ear than amplitude changes, the masking region (which is a circle in FIGS. 3a to 3c) may have a kidney shape.

For simplicity reasons a circular masking region is assumed in the embodiments described in this application.

In the embodiment described above the invention was presented in a more specific way, this means in a two-point solution, wherein no stream value to watermark symbol mapping is performed. This two-point solution may be of great importance for current practical applications. However, more general multi-point solutions may be of interest in future applications. Therefore, in the following, another embodiment of the invention will be described which extends the specific two-point solution to a more general higher order solution.

Figure 4:
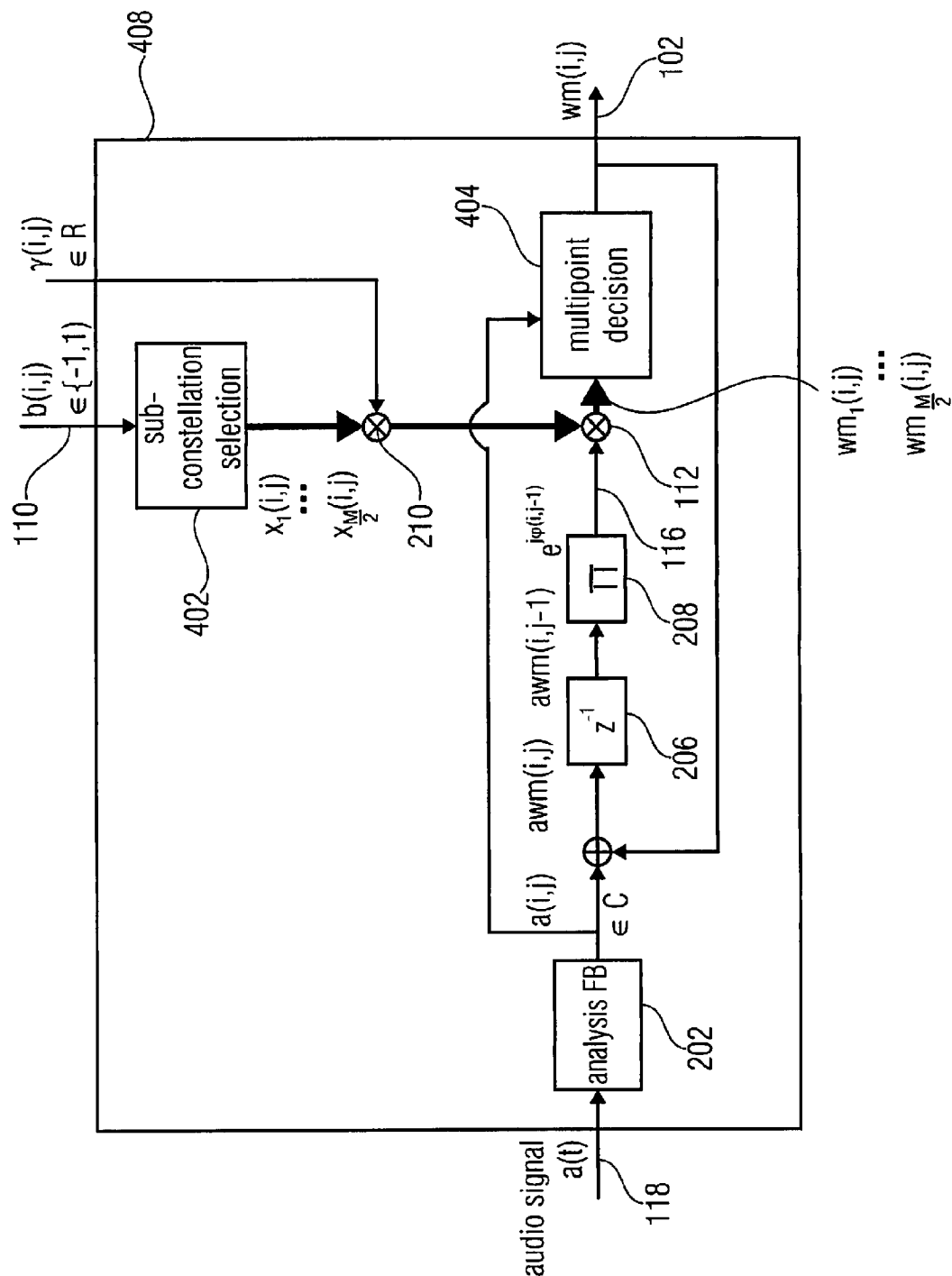
FIG. 4 shows a block schematic diagram of a differential encoder for use in an embodiment of the present invention.

Generalization to Higher Order Constellation Using a Differential Encoder According to FIG. 4

Figure 5:
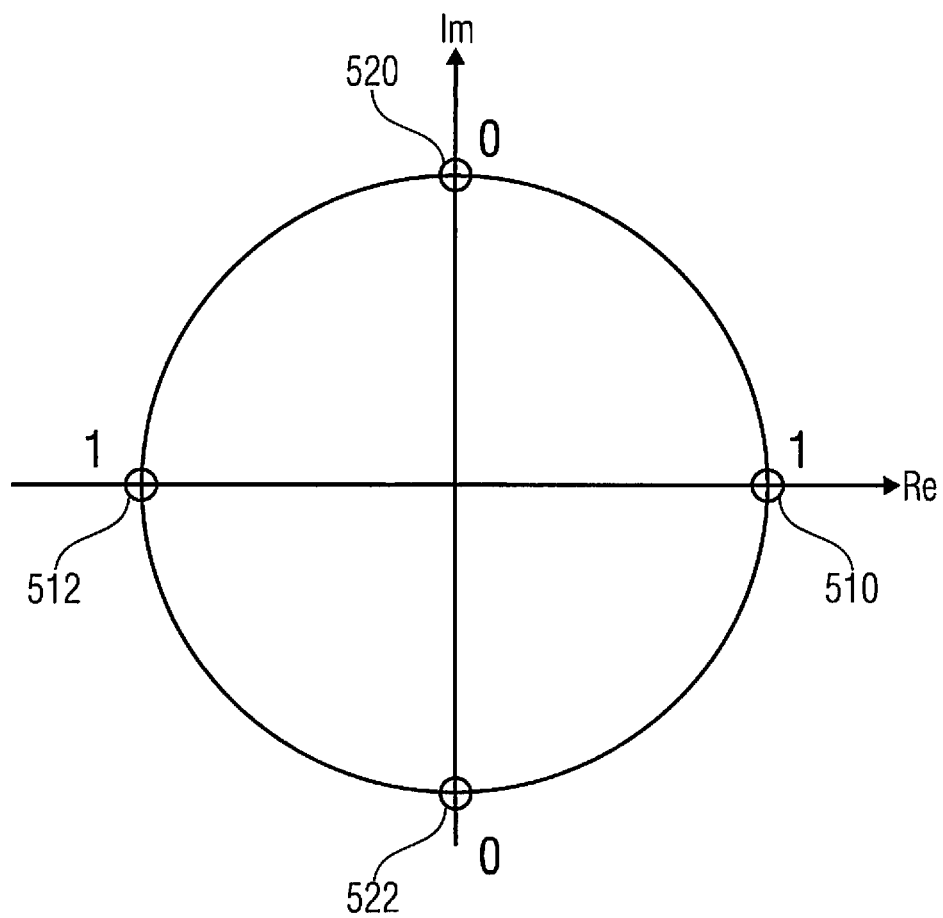
FIG. 5 shows a diagram of an example of mapping stream values to watermark symbols.

Following the same principles used in the previous sections, the invention is now generalized to an M-point constellation. To do so, we allow a different symbols to map the same information as shown in FIG. 5. In this plot, two symbols are allowed for each bit state. For example, for the bit state "1" a first complex symbol 510 with a phase of 0 and a second complex symbol 512 with a phase of π are allowed. For a second bit state "0" a third complex symbol 520 with a phase of π/2 and a fourth complex symbol 522 with a phase of 3π/2 are allowed. The choice between the different symbols can be carried out, once more following the informed embedding idea, this means by considering the current host audio signal (i.e. the current spectral coefficient a(i, j) of the host signal 118) as well as (for the differential encoding) the previous watermarked signal (i.e. the previous spectral coefficient awm(i, j−1) of the watermarked signal).

FIG. 4 shows a block schematic diagram of a differential encoder 408, for use in a watermark generator according to an embodiment of the present invention. The differential encoder 408 differs from the differential encoder 208 in that it is configured to perform the stream value to watermark symbol mapping 114, which was also mentioned as an optional feature of the watermark generator 100 in FIG. 1. To perform this stream value to watermark symbol mapping 114, the differential encoder 408 comprises a subconstellation selector 402 and a decider 404. The decider 404 may also be called multi-point decider 404. The subconstellation selector 402 is configured to selectively provide a plurality of current watermark symbols $x_k(i, j)$ (i, j, k∈N), which constitute a subconstellation, in dependence on the current stream value b(i, j). The index "k" is associated to a symbol number of the current watermark symbol. If one stream value is mapped to a subset of M watermark symbols belonging to two different subconstellations, for each subconstellation k may range from k=1 to k=M/2. A first subconstellation may be associated with a first stream value (e.g. +1) and a second subconstellation may be associated with a second stream value (e.g. −1).

Furthermore, the differential encoder 408 may be configured to apply a phase rotation 112 to each of the current watermark symbols $x_k(i, j)$ of the subconstellation corresponding to the current stream value b(i, j), to obtain a plurality of current candidate watermark coefficients $wm_k(i, j)$. As can be seen from FIG. 4, the differential encoder 408 further may be configured to perform a scaling 210 of each of the current watermark symbols $x_k(i, j)$ based on the current scaling factor γ(i, j) provided by the mentioned psychoacoustical module. The current scaling factor γ(i, j) is equal for each of the current watermark symbols $x_k(i, j)$ of the subconstellation corresponding to the current stream value b(i, j). The differential encoder 408 may therefore also be configured to apply the phase rotation 112 to a scaled version of the current watermark symbols $x_k(i, j)$.

According to further embodiments of the present invention the differential encoder 408 may firstly perform the phase rotation 112 and then perform the scaling 210.

The decider 404 may be configured to choose one out of the current candidate watermark coefficients $wm_k(i, j)$ as the current watermark coefficient wm(i, j).

As an example, the differential encoder 408, or, more precise the subconstellation selector 402 may code 1 bit (one stream value of the stream 110) with M symbols. In the following it is assumed that the stream 110 only contains binary values or in other words the stream values of the stream 110 can only take binary values. For example, the stream values may be either −1 or +1. The current stream value b(i, j) may therefore be ∈{−1, 1}. The current stream value b(i, j) or the bit b(i, j) enters the subconstellation selection block or the subconstellation selector 402. An output of the subconstellation selector 402 comprises, as stated in FIG. 6, M/2 complex watermark symbols $x_1(i, j), \ldots x_{M/2}(i, j)$. The M/2 points constitute the subconstellation, which corresponds to one bit state or in other words the subconstellation corresponds to the current stream value b(i, j). Put in mathematical terms, the k-th point of the subconstellation can be computed as:

$$x_k(i, j) = \exp(j(2\Delta \cdot (k-1) + \eta(i, j))) \quad (7)$$

where $$\Delta = \frac{2\pi}{M} \quad (8)$$

and $\eta(i, j) = 0$ for $b(i, j) = 1$
$\eta(i, j) = \Delta$ for $b(i, j) = -1$.

Figure 6A:
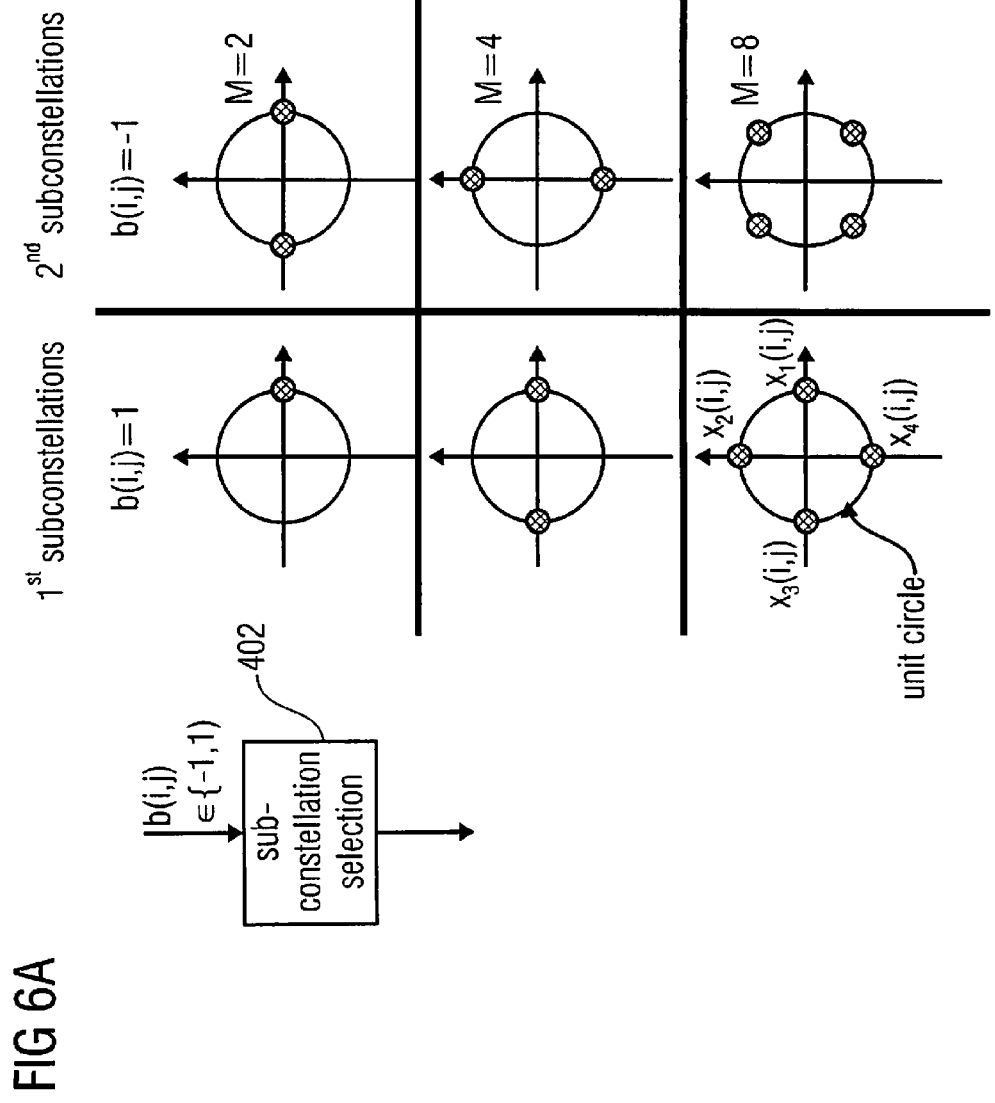
FIG. 6a shows diagrams of possible outputs for different stream values in dependence on a maximum number of watermark symbols associated to the same stream value.

As can be seen in FIG. 6a for M=2 there is only one symbol in each subconstellation and we have simply $x_1(i, j)=b(i, j)$, which was the case with the differential encoder 208 of FIG. 2.

From FIG. 6 it can be seen that for each state of the bit b(i, j) or for each value of the current value b(i, j) different subconstellations are provided by the subconstellation selector 402. Furthermore, it can be seen that the subconstellation selector 402 may provide the plurality of current watermark symbols $x_k(i, j)$ as complex values, such that different current watermark symbols only differ in phase and such that phase differences of different adjacent current watermark symbols associated with the same current stream value b(i, j) are equal. For example, for M=8, a phase difference between watermark symbols of the same subconstellation is π/2.

Furthermore, a first subconstellation may correspond with a first value of the current stream value b(i, j), for example, b(i,j)=1, and a second subconstellation may correspond with a second value of the current stream value b(i, j), for example, b(i, j)=−1. Furthermore, a phase difference between two adjacent watermark symbols of different subconstellations is equal and is half of the phase difference between two adjacent watermark symbols of the same subconstellation.

As can be seen from FIG. 4, each symbol in the subconstellation, in other words each watermark symbol $x_k(i, j)$ of the subconstellation is scaled according to the current scaling factor γ(i, j) given by the psychoacoustic model and is then rotated according to the phase 116 of the previous spectral coefficient awm(i, j−1) of the watermarked signal. Each scaled and rotated symbol in the subconstellation entering the decider 404, for example as the current watermark candidates $wm_k(i, j)$, is a candidate for the current watermark coefficient wm(i, j).

The decider 404 chooses which of the candidates, denoted by $wm_1(i, j), \ldots wm_{M/2}(i, j)$ should be used as watermark (as the current watermark coefficient wm(i, j)).

One possibility is to choose the candidate out of the current candidate watermark coefficients $wm_k(i, j)$ (k=1 . . . M/2) which maximizes a signal-to-noise ratio of the watermarked signal with respect to channel noise. In this case the decider 404 may be configured to add each candidate $wm_k(i, j)$ (k=1 . . . M/2) to the current spectral coefficient a(i, j) of the host signal 118 to obtain watermarked signal candidates $awm_1(i, j), \ldots awm_{M/2}(i, j)$, which are also denoted as current candidate watermarked spectral coefficients $awm_k(i, j)$ (k=1 ... M/2) and choose the one with the highest power. In mathematical terms:

$$k^{opt} = \underset{k}{\mathrm{argmax}} |awm_k(i, j)|^2. \tag{9}$$

so that the watermark signal or the current watermark coefficient is $$wm(i,j) = wm_{k^{opt}}(i,j). \tag{10}$$

In other words the decider 404 may be configured to derive the plurality of current candidate watermarked spectral coefficients $awm_k(i, j)$ (k=1 ... M/2) based on combinations of the current spectral coefficient a(i, j) of the host signal 118 with the plurality of candidate watermark coefficients $wm_k(i, j)$ (k=1 ... M/2), to determine the current candidate watermark spectral coefficient with the highest power out of the plurality of current candidate watermarked spectral coefficients $awm_k(i, j)$ (k=1 ... M/2) to choose the current candidate watermark coefficient corresponding to the current candidate watermarked spectral coefficient having the highest power as the current watermark coefficient.

It should be pointed out once more that embodiments of the present invention implement a differential encoding implicitly.

For using a higher order M the signal-to-noise ratio of the watermarked signal can be improved, meaning that the watermark may survive more easily the distortions introduced, for example by microphone noise. On the other hand, the symbols in the subconstellation are closer for larger M (this means the phase difference gets smaller). This implies that the bit error rate BER will increase. Given this tradeoff, the choice of M depends on the desired application.

Figure 6B:
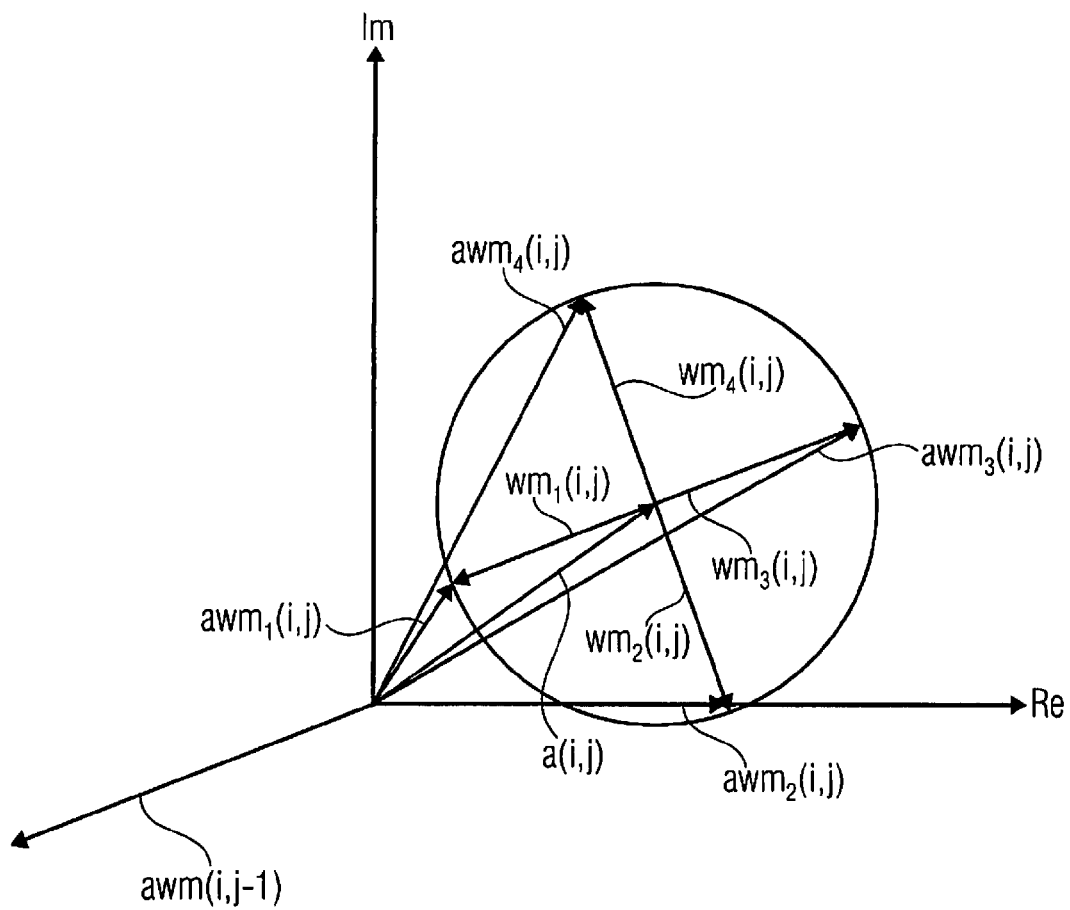
FIG. 6b shows a diagram of an example on how a watermark coefficient is derived in an M-point constellation using the differential encoder from FIG. 4.

FIG. 6b shows in an example how the decider 404 decides which current candidate watermark coefficient out of the plurality of current candidate watermark coefficients $wm_k(i, j)$ (k=1 ... M/2) to use as the current watermark coefficient wm(i, j). In the example it is assumed that the subconstellation selector 402 codes one bit with one of a total out of eight symbols. This means M=8. Furthermore, it is assumed that the value of the current stream value b(i, j)=1. From FIG. 6a the subconstellation for this case can be found in the first column, third row of the table shown in FIG. 6a. The subconstellation therefore comprises four current candidate watermark symbols $x_1(i, j)$ to $x_4(i, j)$, which are spaced apart from each other with a phase of $\pi/2$. In FIG. 6b the current watermark symbols $x_1(i, j)$ to $x_4(i, j)$ have already been scaled and phase rotated to obtain the current candidate watermark coefficients $wm_1(i, j)$ to $wm_4(i, j)$. The multipoint decider 404 derives, based on the combination of the current spectral coefficient a(i, j) of the host signal 118 and the current candidate watermark coefficients $wm_1(i, j)$ to $wm_4(i, j)$, the current candidate watermarked spectral coefficients $awm_1(i, j)$ to $awm_4(i, j)$. The decider 404 then chooses the current candidate watermark coefficient which corresponds to the current candidate watermarked spectral coefficient with the highest power. In the example shown in FIG. 6b the decider 404 would choose the current candidate watermark coefficient $wm_3(i, j)$ as the current watermark coefficient wm(i, j), because its corresponding current candidate watermarked spectral coefficient $awm_3(i, j)$ has the highest power out of the current candidate watermarked spectral coefficients $awm_1(i, j)$ to $awm_4(i, j)$.

In other words, the watermark coefficients wm(i, j) are chosen such that awm(i, j) lies within the masking region and the signal-to-noise ratio at the decoder after differential decoding is maximized, e.g. when a decoding rule like in equation 13 is used.

It should be noted that to obtain the special case shown in the embodiment of FIG. 2, namely M=2, the scheme in FIG. 4 simplifies greatly. As already mentioned, the subconstellation selector 402 can be superfluous as we have only one candidate which is $x_1(i, j)$=b(i, j). Therefore, the decider 404 may also be removed, as no choice is necessitated.

After describing the two differential encoders 208, 408 in the following another watermark generator, which may use the differential encoders 208, 408, will be explained taking reference to FIG. 7.

Figure 7:
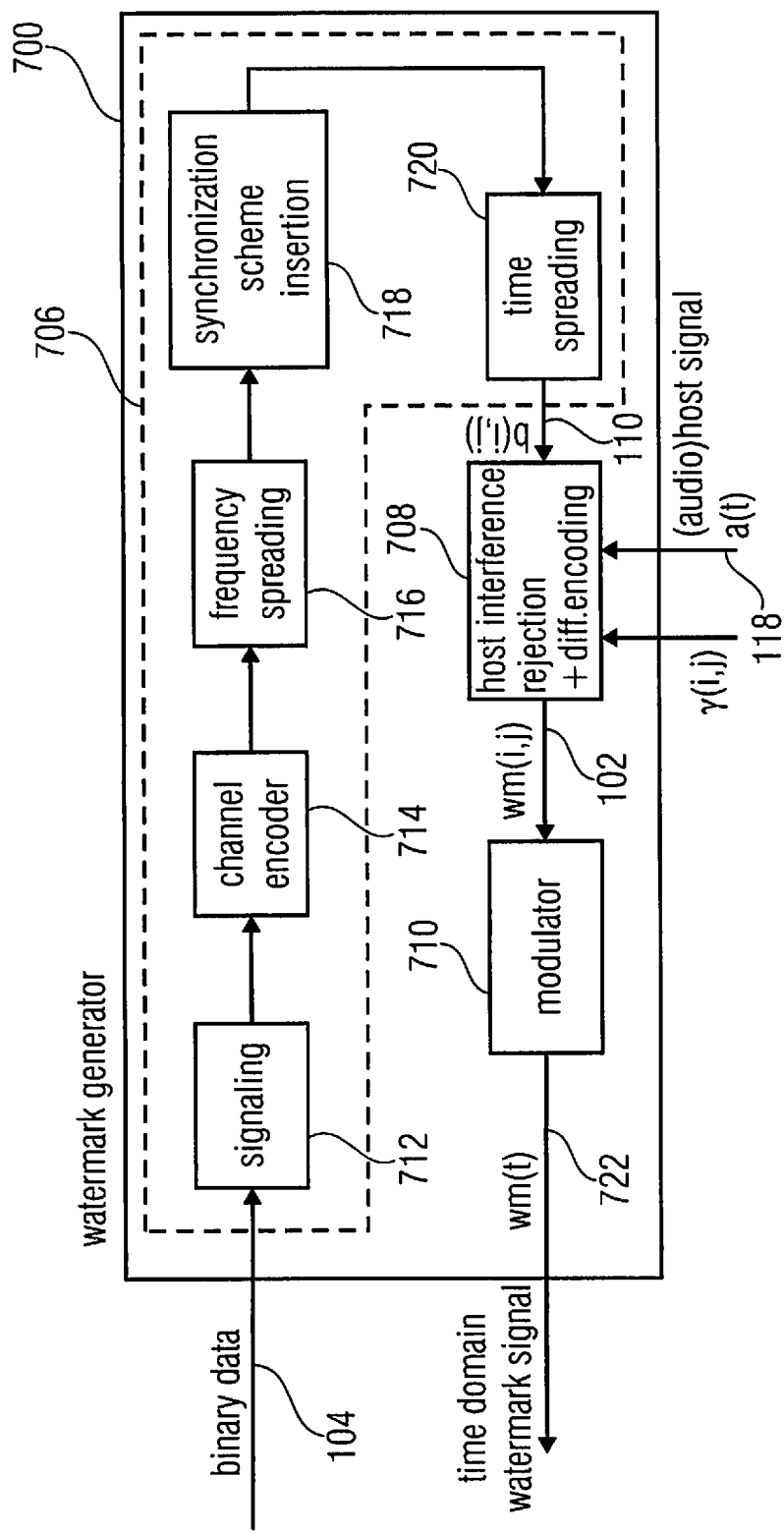
FIG. 7 shows a block schematic diagram of a watermark generator according to a further embodiment of the present invention.

The Watermark Generator According to FIG. 7

FIG. 7 shows a block schematic diagram of a watermark generator 700 according to an embodiment of the present invention. A functionality of the watermark generator 700 may be similar to functionality of the watermark generator 100. The watermark generator 700 may comprise the optional features shown in FIG. 7. The watermark generator 700 comprises an information processor 706, a differential encoder 708 and a modulator 710. A functionality of the information processor 706 may be similar to the functionality of the information processor 106 and the information processor 706 may comprise the additional features shown in FIG. 7. The differential encoder 708 may be the differential encoder 108, the differential encoder 208, the differential encoder 408 or another differential encoder according to an embodiment of the present invention.

For the description of the watermark generator 700 a stream 104 of binary data expressed as {−1, 1} is assumed. A signaling block 712 of the information processor 706 organizes the data in packets of equal length and appends overhead bits. A packet of payload bits together with the overhead is denoted as a message.

A channel encoder 714 of the information processor 706 adds redundancy to the message for forward error correction purposes.

Afterwards, the data is spread in frequency, for example binary data for the different subchannels i is generated by a frequency spreader 716 of the information processor 706.

In order to facilitate decoding, a synchronization signal is inserted by multiplying the matrix of binary information by a concatenation of synchronization sequences. This synchronization scheme insertion can be performed by a synchronization scheme inserter 718 of the information processor 706.

A time spreader 720 of the information processor 706 carries out a spreading in time domain, this means adds further redundancy in order to gain more robustness against noise. An output of the information processor 706 is binary data (for example the stream 110 of subsequent stream values, also denoted as b(i, j)), where i indicates a subchannel and j indicates the time slot or symbol number.

The differential encoder 708 carries out the host interference rejection and differential encoding process on the stream 110 of subsequent stream values which is provided by the time spreading block 720. The differential encoder 708 may also be denoted as host interference rejection and differential encoding block 708. The differential encoder 708 may for example be similar or equal to the differential encoder 108 from FIG. 1, the differential encoder 208 from FIG. 2 or the differential encoder 408 from FIG. 4. The differential encoders 108, 208, 408 have been described before, therefore a repeated description of the differential encoder 708 is omitted.

The differential encoder 708 provides the watermark signal 102 in the time frequency domain as a sequence of subsequent watermark coefficients wm(i, j) (i, j∈N) for a plurality of frequency bands. In other words the output of the differential encoder 708 consists of the watermark coefficients wm(i, j) (i, j∈N). The modulator 710 is configured to derive the watermark signal in a time domain based on the subsequent watermark coefficients of the watermark signal 102 in the time frequency domain. The modulator 710 therefore provides the watermark signal 722 as a time domain watermark signal 722, which is also denoted as wm(t). In other words, the job of the remaining modulator 710 is to convert the watermark coefficients wm(i, j), (i, j∈N), into the time signal wm(t).

The resulting time domain watermark signal 722 (wm(t)) is the watermark which can be added to the (audio) host signal a(t).

In the following, the watermark generator which is described in EP 10154964 shall be explained in short as a comparison example to the watermark generator 700 according to an embodiment of the present invention shown in FIG. 7.

Conventional Watermark Generator as a Comparison Example

Figure 8A:
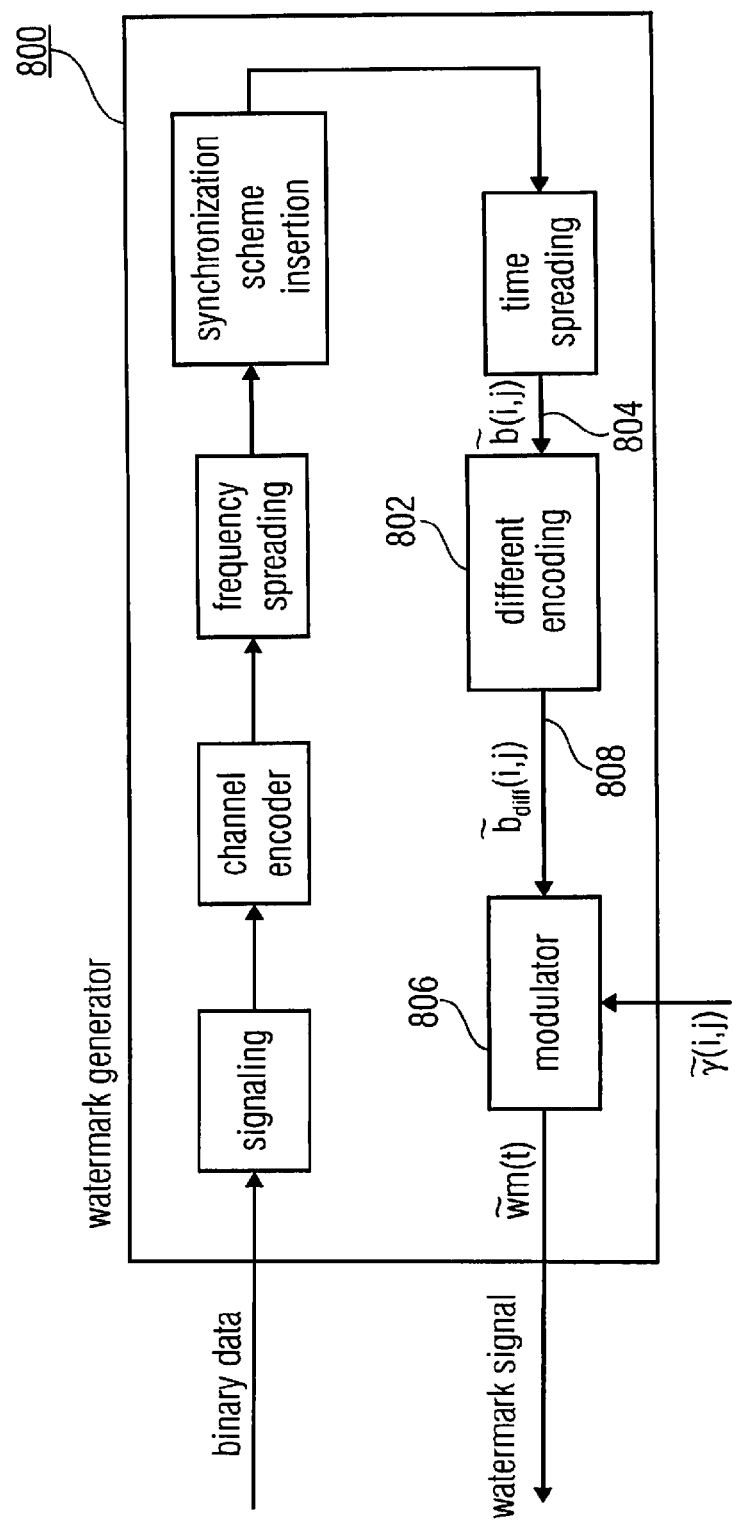
FIG. 8a shows as a comparison example to FIG. 7, a block schematic diagram of a watermark generator as described in EP 10154964.

FIG. 8a shows a block schematic diagram of a watermark generator 800 as it is described in EP 10154964. The watermark generator 800, like the watermark generator 700, may also perform the signaling, channel encoding, frequency spreading, synchronization scheme inserting and time spreading to the binary data at its input, to obtain a stream 804 of binary data as a sequence of subsequent binary values b(i, j) (i, j∈N) for a plurality of frequency bands. The watermark generator 800 comprises a differential encoder 802 which then performs a differential encoding on the stream 804 of binary data. An output of the differential encoder 802 is:

$$\tilde{b}_{diff}(i,j) = \tilde{b}_{diff}(i,j-1) \cdot \tilde{b}(i,j). \quad (11)$$

The output of the differential encoder 802 is a stream 808 of subsequent differentially encoded binary coefficients $\tilde{b}_{diff}(i, j)$ (i, j∈N). A modulator 806 of the watermark generator 800 transforms the resulting binary data $\tilde{b}_{diff}(i, j)$ (i, j∈N) into a time signal and performs amplitude scaling at the same time according to scaling factors (for example $\tilde{\gamma}(i, j)$) given by a psychoacoustical model. One can regard the differentially encoded binary coefficients $\tilde{b}_{diff}(i, j∈N)$ as coefficients and the modulator 806 as a synthesis filter bank that first scales the coefficients and then transforms them into time domain. A resulting time signal $\tilde{w}m(t)$ is the watermark which can be added to an audio host signal a(t).

Figure 8B:
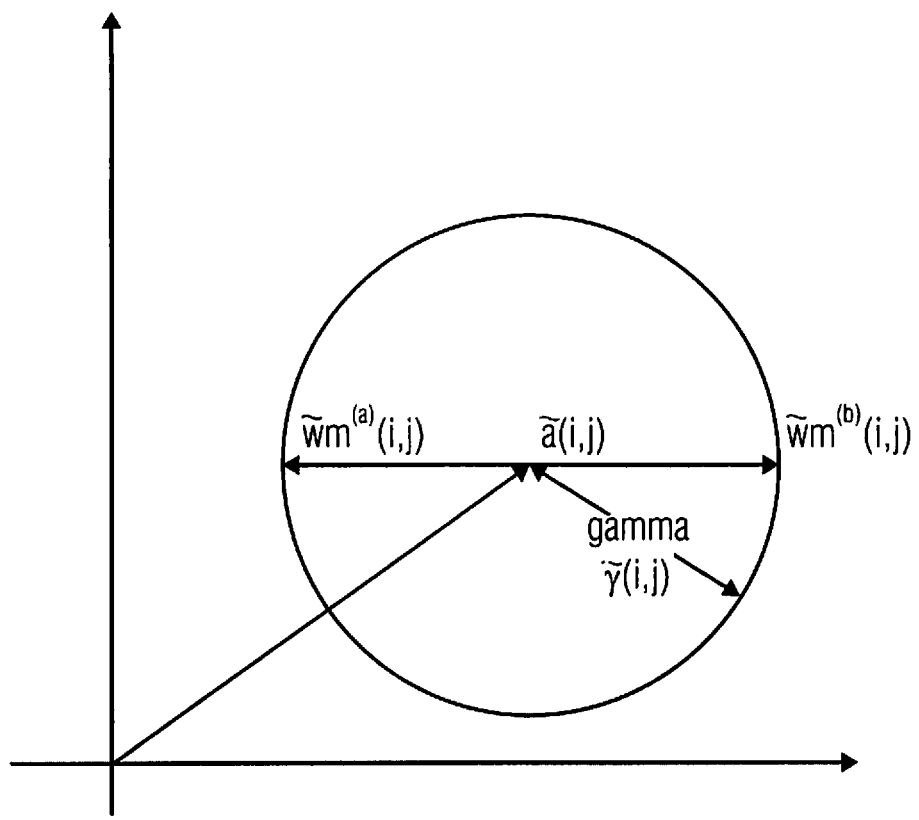

FIG. 8b shows the embedding principle of the system proposed in EP 10154964. Please note that the scaling factor $\tilde{\gamma}(i, j)$ for the coefficient amplitudes are already included in $\tilde{w}m(i, j)$. In fact, $\tilde{w}m(i, j) = \tilde{b}_{diff}(i, j) \cdot \tilde{\gamma}(i, j)$.

The watermark $\tilde{w}m(i, j)$ is chosen between $\tilde{w}m^{(a)}(i, j)$ or $\tilde{w}m^{(b)}(i, j)$ depending on $\tilde{b}_{diff}(i, j)$. In other words either $\tilde{w}m^{(a)}(i, j)$ or $\tilde{w}m^{(b)}(i, j)$ is chosen as the watermark $\tilde{w}m(i, j)$ depending on $\tilde{b}_{diff}(i, j)$.

It can be observed that both $\tilde{w}m^{(a)}(i, j)$ and $\tilde{w}m^{(b)}(i, j)$ have been constructed regardless of the host audio signal (with the exception of the factor $\tilde{\gamma}(i, j)$ provided by the psychoacoustical model, which has (obviously) analyzed the host signal and adjusted the factor $\tilde{\gamma}(i, j)$ in accordance with frequency masking effects and temporal masking effects).

In the following a short example for an application, in which a watermark generator according to an embodiment of the present invention can be used, shall be shown.

Example of an Application Using the Watermark Generator 700

Figure 9:
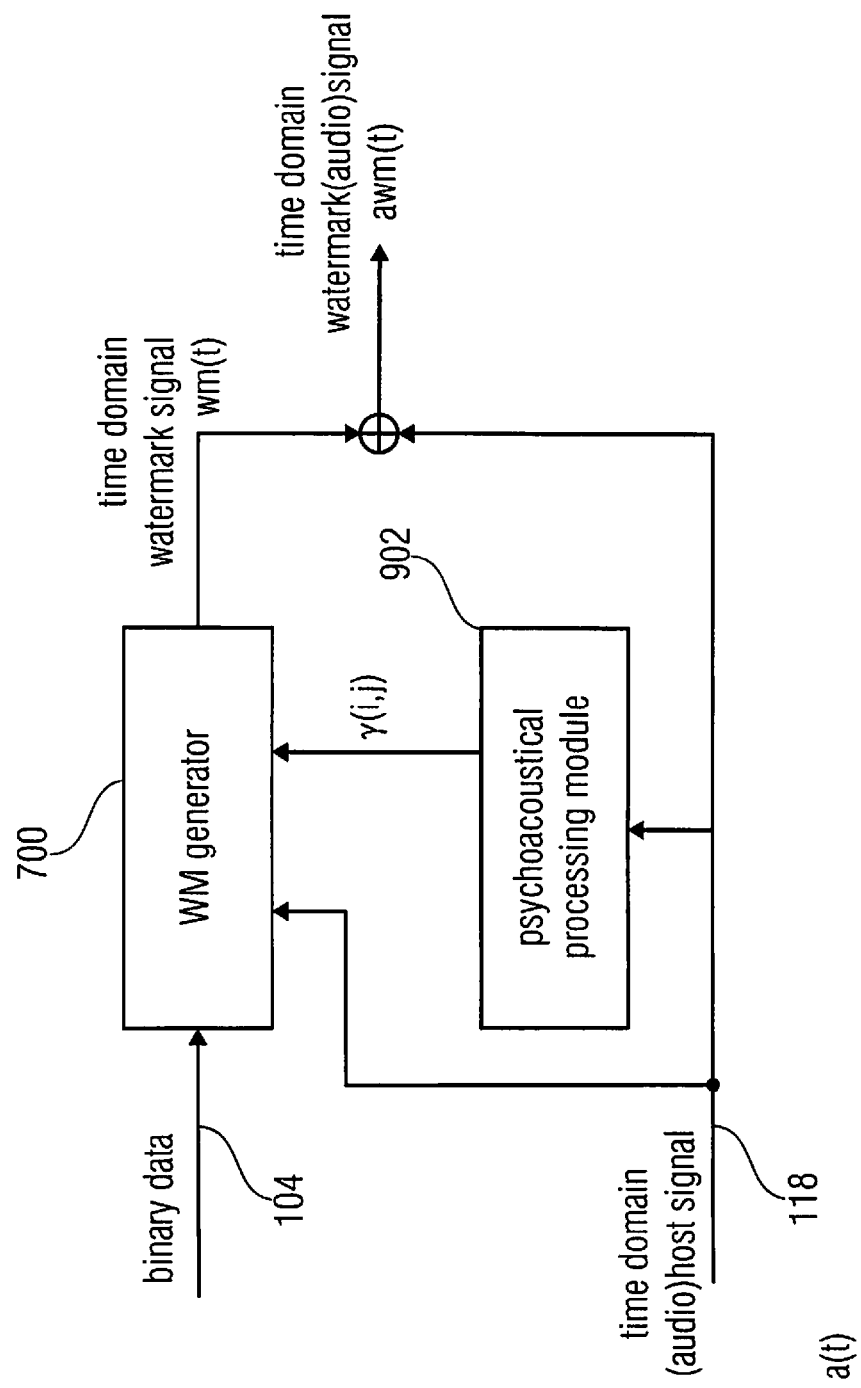
FIG. 9 shows a block schematic diagram of a watermarked audio signal provider with a watermark generator according to an embodiment of the present invention.

FIG. 9 shows a block schematic diagram of the watermark generator 700 from FIG. 7 in conjunction with a psychoacoustical processing module 902 to provide a time domain watermarked audio signal awm(t). In this example the watermark generator 700 is only used as an example. The watermark generator therefore may be substituted with any other watermark generator according to embodiments of the present invention. As can be seen from FIG. 9 the watermark generator 700 receives as inputs discrete valued data 104 (in the present example binary data 104), a host signal 118 (in the present example a time domain audio host signal 118) and a current scaling factor γ(i, j). The scaling factor γ(i, j) is provided by the psychoacoustical processing module 902 based on the time domain audio host signal 118. The psychoacoustical processing module 902 provides scaling factors γ(i, j) (i, j∈N) for each stream value b(i, j) (i, j∈N) which are internally generated in the watermark generator 700. In other words, the psychoacoustical processing module 802 provides the current scaling factor γ(i, j) in each subchannel i (at center frequency $f_i$) and for each time slot j.

As mentioned before, the resulting signal of the watermark generator 700 is the time domain watermark signal wm(t). This resulting time signal wm(t) is the watermark which is added to the time domain audio host signal a(t). The watermarked host signal:

$$awm(t) = a(t) + wm(t) \quad (12)$$

can be transmitted over a communication channel and constitutes a received signal y(t) at the receiver.

In the following a method for generating a watermark signal will be explained.

Figure 10:
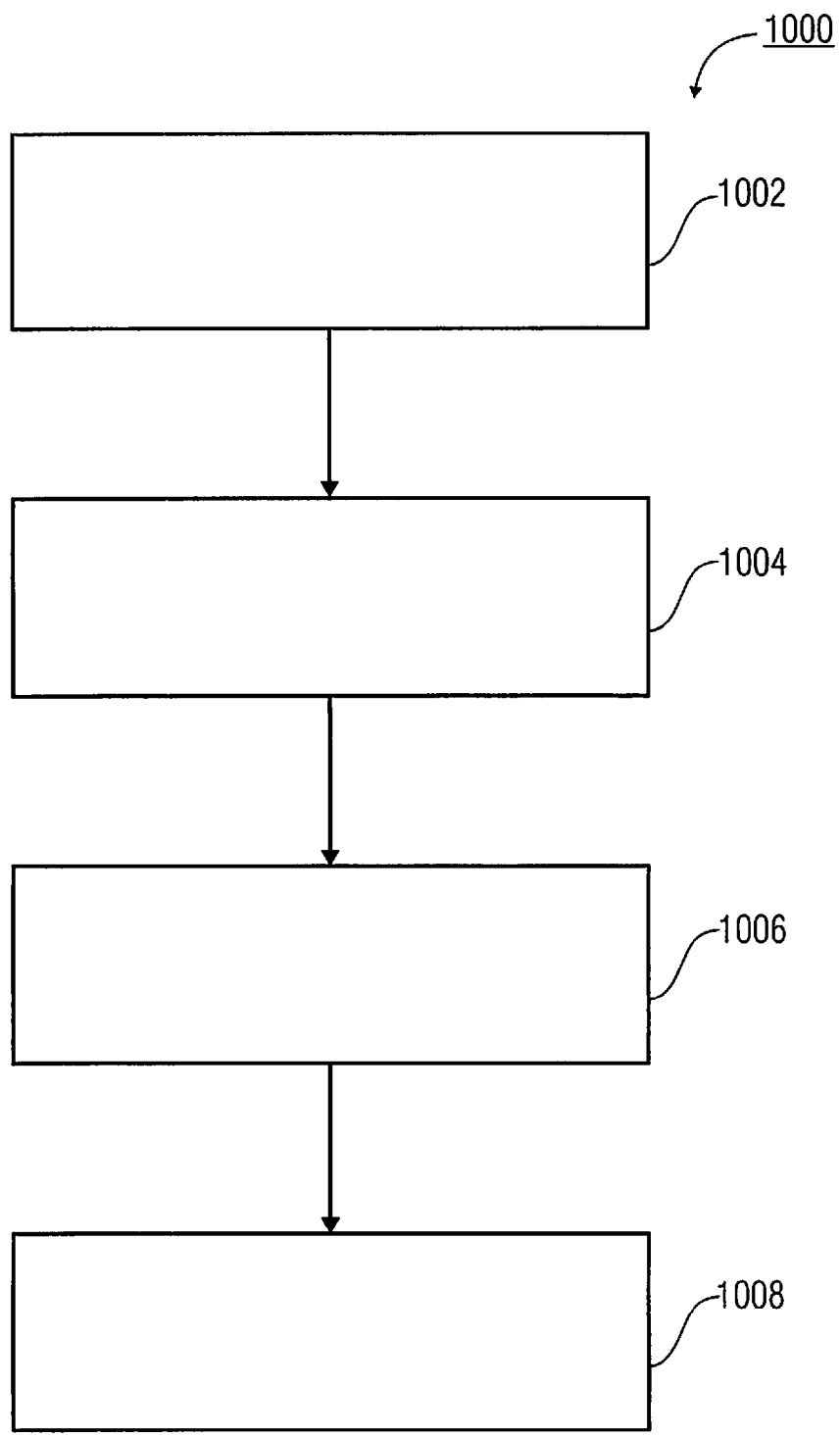
FIG. 10 shows a flow diagram of a method according to an embodiment of the present invention.

Method for Generating a Watermark Signal According to FIG. 10

FIG. 10 shows a flow diagram of a method 1000 for providing a watermark signal as a sequence of subsequent watermark coefficients based on discrete valued data.

The method 1000 comprises a step 1002 of providing in dependence on information units of the discrete valued data a first stream of subsequent values, such that the first stream represents the discrete valued data.

The method 1000 further comprises a step 1004 of applying a phase rotation to a current stream value or to a current watermark symbol, the current watermark symbol corresponding to a current stream value of the stream values representing the discrete valued data, to obtain a current watermark coefficient of the watermark signal.

The method 1000 further comprises a step 1006 of deriving a phase of a spectral coefficient of a watermarked signal which is a combination of a host signal and the watermark signal.

The method 1000 further comprises a step 1008 of providing the watermarked signal such that a phase angle of the phase rotation applied to the current stream value or to the current watermark symbol is dependent on the phase of the previous spectral coefficient of the watermarked signal.

In the following, a decoder for decoding a watermark signal generated by a watermark generator according to an embodiment of the present invention will be described.

Figure 11:
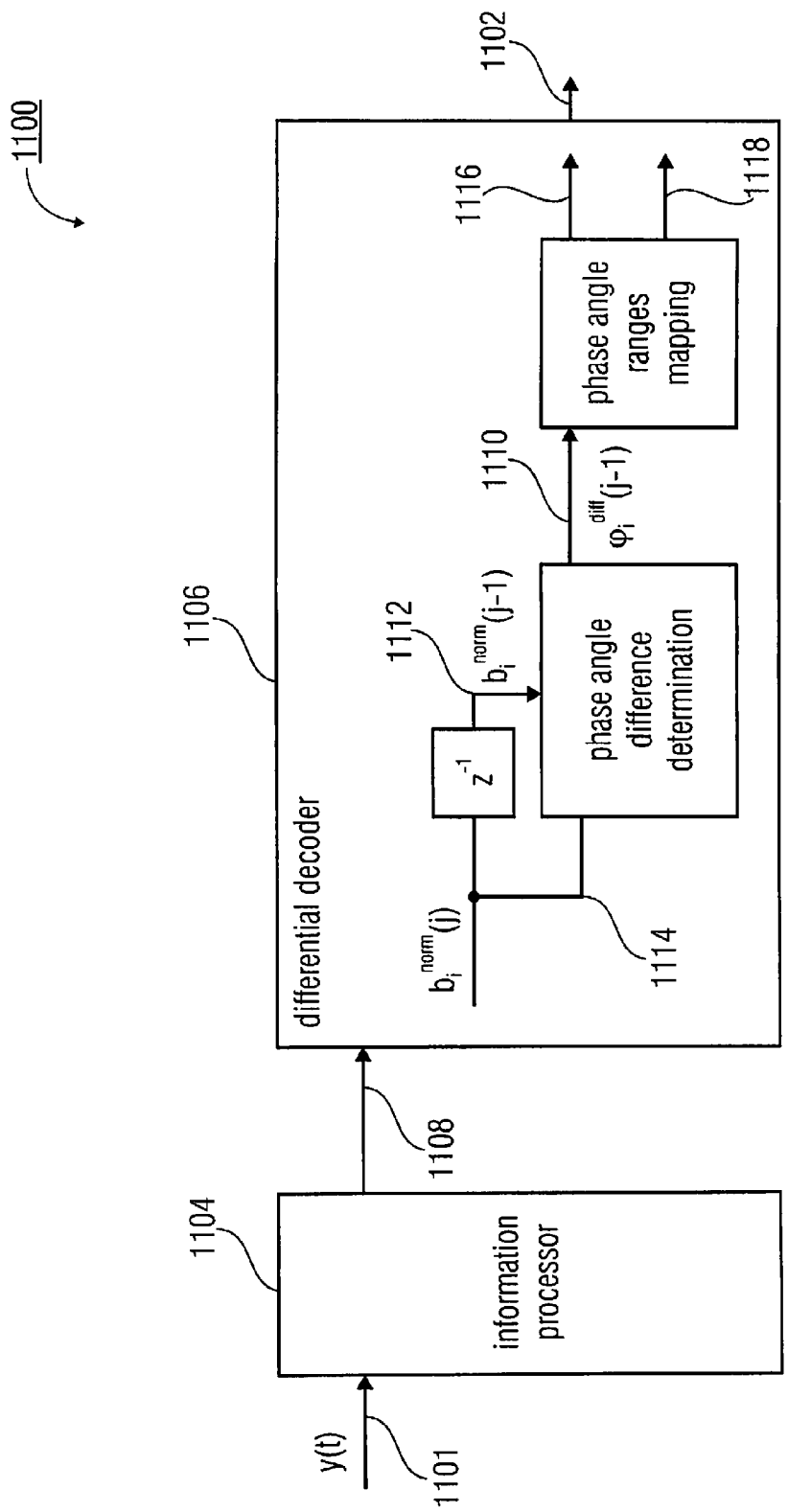
FIG. 11 shows a block schematic diagram of a watermark decoder according to an embodiment of the present invention.

Watermark Decoder According to FIG. 11

In a receiver, which comprises a watermark decoder, typically the inverse of the mentioned operations for generating the watermark signal is carried out in reverse order to decode the watermark. For the case that the differential encoder 208 from FIG. 2 is used in the watermark generator to generate the watermark signal, the differential decoding can be performed by:

$$\hat{b}_i(j) = \text{Re}\{b_i^{norm}(j) \cdot b_i^{norm*}(j-1)\} = \quad (13)$$
$$= |b_i^{norm}(j)| \cdot |b_i^{norm}(j-1)| \cdot \cos(\varphi_i(j) - \varphi_i(j-1)) \quad (14)$$

where $\phi_i(j) = \angle b_i^{norm}(j)$. $b_i^{norm}(j)$ are normalized complex coefficients given by an analysis filter bank in subchannel i (at center frequency $f_i$) representing a received signal y(t) and the variable j is the temporal index. The resulting real valued soft bits $\hat{b}_i(j)$ Ware the estimates of b(i, j). The differential decoding works in that if the phase difference is 0 the cosine is 1, whereas for a phase difference equal to $\pi$ the cosine becomes $-1$. y(t) represents the watermarked signal awm(t) which has been transmitted over a communication channel. This differential decoding principle works fine for watermark signals generated by the differential encoder 208 in which the phase rotation 112 is directly applied to the current stream values b(i, j) (i, j∈N) of the stream 110. In other words this decoding principle works for differential encoders in which no stream value to watermark symbol mapping 114 is applied. Therefore, a decoder, which is configured to decode the watermark signal 102 generated by the differential encoder 208 can be similar to a decoder, which is configured to decode a watermark signal generated by the differential encoder 802 of the watermark generator stated in EP 10154964.

In contrast to this, the use of a M-point constellation with M>2 implies a use of a different decoder. Such an M-point constellation has been shown with the differential encoder 408 according to FIG. 4, which applies a stream value to watermark symbol mapping 114 to each of the stream values b(i, j) (i, j∈N) of the stream 110.

FIG. 11 shows a block schematic diagram of a decoder 1100 according to an embodiment of the present invention, which is configured to decode such M-point constellation watermark signals. The watermark decoder 1100 for providing discrete valued data 1102 comprises an information processor 1104 and a differential decoder 1106, the information processor 1104 is configured to provide a stream 1108 of complex valued spectral coefficients $b_i^{norm}(j)$ (i, j∈N), the stream 1108 representing the watermarked signal 1101. The information processor 1104 may be configured to provide a stream 1108 for each frequency subchannel i.

The differential decoder 1106 is configured to determine a phase angle difference 1110 (also denoted as $\phi_i^{diff}(j)$) between a previous complex valued spectral coefficient 1112 (also denoted as $b_i^{norm}(j-1)$) and a current complex valued spectral coefficient 1114 (also denoted as $b_i^{norm}(j)$). The differential decoder 1106 is further configured to map phase angle differences within at least two different phase angle ranges to a first discrete value 1116 of the discrete valued data 1102 and to map phase angle differences within at least another two different phase angle ranges to a second discrete value 1118 of the discrete valued data 1102. The discrete valued data 1102 may for example be binary data and the first discrete value 1116 may for example correspond to a logical 1 and the second discrete value 1118 may for example correspond to a logical −1 or 0.

In other words, the differential decoder 1106 may be configured to choose in response to the determined phase difference 1110 falling into the phase angle ranges mapped to the first discrete value 1116, the first discrete value as a value for a current element of the discrete valued data 1102 and to choose in response to the determined phase difference 1110 falling into the phase angle ranges mapped to the second discrete value 1118, the second discrete value as a value for the current element of the discrete valued data 1102.

The information processor 1104 may be configured to provide the stream 1108 of complex spectral coefficients in a frequency time domain, such that each spectral coefficient corresponds to one frequency subchannel i and one time slot j. The differential decoder 1106 may be configured such that the previous complex spectral coefficient 1112 and the current complex spectral coefficient 1114 correspond to adjacent time slots j, j−1 and to the same frequency subchannel i.

Figure 12:
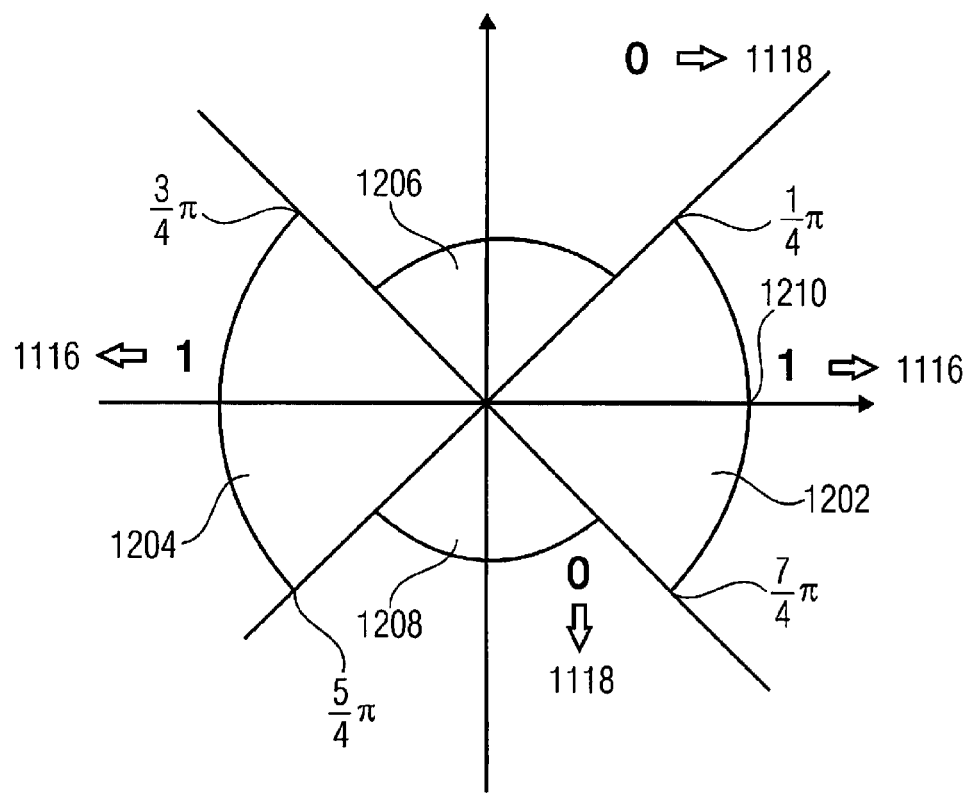
FIG. 12 shows a diagram of an example of the mapping of different phase angle ranges to discrete values of discrete valued data like it is performed by the watermark decoder from FIG. 11.

FIG. 12 shows how the differential decoder 1106 may perform the mentioned phase angle ranges mapping. FIG. 12 shows the special case for M=4. This means two different phase angle ranges are mapped to the first discrete value 1116 of the discrete valued data 1102 and another two different phase angle ranges are mapped to the second discrete value 1118 of the discrete value data 1102. In FIG. 12 a phase angle is drawn in an anti clockwise direction starting from a point 1210 with the a phase angle of 0.

A first angle range 1202 which ranges from −π/4 (or 7π/4) to π/4 and a second phase angle range 1204 which ranges from 3π/4 to 5π/4 are mapped to the first discrete value 1116 by the differential decoder 1106. A third phase angle range 1206 which ranges from π/4 to 3π/4 and a fourth phase angle range 1208 which ranges from 5π/4 to 7π/4 are mapped to the second discrete value 1118 of the discrete value data 1202 by the differential decoder 1106. Comparing this diagram shown in FIG. 12 with the diagrams shown in FIG. 6a for the case in which M=4 it can be seen that the mapping performed in the decoder matches the mapping performed in the encoder. Widths of the phase angle ranges 1202, 1204, 1206, 1208 are equal for all of the phase angle ranges 1202, 1204, 1206, 1208 and are 2ζ/M (in the special case which is shown in FIG. 12, where M=4 the width is π/2). As can be seen from of the combination of FIG. 6a and FIG. 12 a phase drift through the communication channel smaller than π/4 may not lead to a bit error.

As can be seen from FIG. 12 the differential decoder 1106 may be configured to map the phase angle ranges to the discrete values such that adjacent phase angle ranges are mapped to two different discrete values of the discrete value data 1102.

From the explanations made above it becomes clear that the use of an M-point constellation with M>2 implies the use of a different decoder. One significant difference to conventional (traditional) decoders is the mapping of the bits, in that a traditional system typically codes $\log_2(M)$ bits with M symbols, whereas at least some of the proposed systems code 1 bit with M symbols.

In the following some aspects of the present invention will be summarized in short.

A watermark scheme employed in embodiments of the present invention comprises a multi-channel differential BPSK method for embedding digital information in an audio signal. Each of several subchannels i is related to a frequency ($f_i$) of a time frequency representation of the audio signal a(t). The information to be transmitted in one subchannel is contained in the phase difference of consecutive coefficients b(i, j) (i, j∈N) of a time frequency representation.

Embodiments of the present invention have been presented in a more specific way using the differential encoder 208 in FIG. 2 and have been presented in a more generalized way using the differential encoder 408 in FIG. 4. The two-point solution shown in FIG. 2 may be of greater importance for the current practical application. However, the more general multipoint solution presented in FIG. 4 might be of interest in future applications.

At least some embodiments of the present invention relate to digital audio watermarking, i.e. some modification of an audio signal in order to hide digital data and the corresponding decoder capable of receiving this information while the perceived quality of the modified audio signal remains indistinguishable (inaudible) to the one of the original.

Embodiments of the present invention implement differential encoding implicitly by providing a current watermark coefficient based on a previous spectral coefficient of the watermarked signal.

Embodiments of the present invention create a method for generating an inaudible watermark featuring differential encoding in the time frequency domain. The watermark is shaped optimally, or at least approximately optimally or signal-adapted, considering the host audio signal to maximize the decoder performance. Moreover, the choice of the order of the symbol constellation allows to tradeoff robustness against external noise sources (i.e. better signal-to-noise ratio of the watermarked signal) versus better bit error rates.

Embodiments of the present invention create a (partly) host interference rejecting watermark embedding method which implicitly contains a differential encoding scheme.

Implementation Alternatives

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

Naturally, the concept described herein may also be used for watermarking of video signals or image signals.

The invention claimed is:

1. A watermark generator for providing a watermark signal as a sequence of subsequent watermark coefficients based on a stream of subsequent stream values representing discrete valued data, the watermark generator comprising:
   a differential encoder configured to provide the watermark signal, wherein the differential encoder is configured to apply a phase rotation to a current stream value of the stream values representing the discrete valued data or to a current watermark symbol, the current watermark symbol corresponding to a current stream value of the stream values representing the discrete valued data, to acquire a current watermark coefficient of the watermark signal;

wherein the differential encoder is configured to derive a phase of a previous spectral coefficient of a watermarked signal which is a combination of a host signal and the watermark signal;

wherein the differential encoder is configured to provide the watermark signal such that a phase angle of the phase rotation applied to the current stream value or the current watermark symbol is dependent on the phase of the previous spectral coefficient of the watermarked signal;

wherein the host signal is an audio signal, an image signal or a video signal, and the watermarked signal is an audio signal, an image signal or a video signal; and wherein the differential encoder is implemented using a hardware apparatus, or using a computer, or using a combination of a hardware apparatus and a computer.

2. The watermark generator according to claim 1,
wherein the watermark generator comprises an information processor;
wherein the information processor is configured to provide the stream representing the discrete valued data in a time frequency domain, such that each stream value of the stream is associated to a frequency subchannel and a time slot; and
wherein the differential encoder is configured to acquire the current watermark coefficient in the time frequency domain, such that a frequency subchannel associated to the current watermark coefficient is identical to a frequency subchannel associated to the current stream value and such that a time slot associated to the current watermark coefficient is identical to a time slot associated to the current stream value.

3. The watermark generator according to claim 2,
wherein the differential encoder is configured to derive spectral coefficients of the watermarked signal in a time frequency domain, such that each spectral coefficient of the watermarked signal is associated to a frequency subchannel and a time slot, and
wherein the differential encoder is configured to determine the phase rotation, such that a time slot associated to the previous spectral coefficient of the watermarked signal, in dependence on which the phase angle of the phase rotation applied to the current stream value or the current watermark symbol is chosen, and the time slot associated to the current stream value are adjacent in time.

4. The watermark generator according to claim 3,
wherein the differential encoder is configured such that a frequency subchannel associated to the previous spectral coefficient of the watermarked signal and the frequency subchannel associated to the current stream value are identical.

5. The watermark generator according to claim 1,
wherein the differential encoder is configured to additionally scale the current stream value or the current watermark symbol by a current scaling factor or by a current factor which is smaller than the current scaling factor; and
wherein the current scaling factor is provided by a psychoacoustical processing module in dependence on a host signal into which the watermark signal is to be embedded, and such that the current scaling factor describes a masking characteristic of the host signal.

6. The watermark generator according to claim 5,
wherein the differential encoder is configured to scale the current stream value or the current watermark symbol by the current scaling factor to adjust an amplitude of the current watermark coefficient such that a watermark is inaudible in a watermarked signal determined by a combination of the host signal and the watermark signal.

7. The watermark generator according to claim 1,
wherein the differential encoder comprises a subconstellation selector configured to selectively provide a plurality of current watermark symbols which constitute a subconstellation in dependence on the current stream value,
wherein the differential encoder is configured to apply the phase rotation to each of the current watermark symbols of the subconstellation corresponding to the current stream value or to a scaled version thereof, to acquire a plurality of current candidate watermark coefficients; and
wherein the differential encoder comprises a decider configured to choose one out of the current candidate watermark coefficients as the current watermark coefficient.

8. The watermark generator according to claim 7,
wherein the decider is configured to derive a plurality of current candidate watermarked spectral coefficients based on combinations of a current spectral coefficient of the host signal with the plurality of candidate watermark coefficients to determine the current candidate watermarked spectral coefficient with the highest power out of the plurality of current candidate watermarked spectral coefficients, to choose the current candidate watermark coefficient corresponding to the current candidate watermarked spectral coefficient comprising the highest power as the current watermark coefficient.

9. The watermark generator according to claim 7,
wherein the subconstellation selector is configured to provide the plurality of current watermark symbols as complex values such that different current watermark symbols only differ in phase and such that phase differences of different adjacent current watermark symbols associated with the same current stream value are equal.

10. The watermark generator according to claim 1,
further comprising a modulator configured to derive the watermark signal in a time domain based on the subsequent watermark coefficients.

11. A watermark decoder for providing discrete valued data in dependence on a watermarked signal, the watermark decoder comprising:
an information processor to provide a stream of complex valued spectral coefficients, the stream representing the watermarked signal; and
a differential decoder configured to determine a phase angle difference between a previous complex valued spectral coefficient and a current complex valued spectral coefficient,
configured to map phase angle differences within at least two different phase angle ranges to a first discrete value of the discrete-valued data and to map phase angle differences within at least another two different phase angle ranges to a second discrete value of the discrete valued data;
wherein the differential decoder is configured to distinguish at least between four different phase angle ranges, wherein the differential decoder is configured to map adjacent phase angle ranges to different discrete values of the discrete-valued data;

wherein the watermarked signal is an audio signal, an image signal or a video signal; and wherein the differential decoder is implemented using a hardware apparatus, or using a computer, or using a combination of a hardware apparatus and a computer.

12. The watermark decoder according to claim 11, wherein the information processor is configured to provide the stream of complex spectral coefficients in a time-frequency-domain such that each complex spectral coefficient is associated to one frequency subchannel and one time slot; and wherein the differential decoder is configured such that the previous complex spectral coefficient and the current complex spectral coefficient are associated to adjacent time slots and the same frequency subchannel.

13. A non-transitory digital storage medium comprising a computer program for performing the method for providing a watermark signal as a sequence of subsequent watermark coefficients based on discrete-valued data, the method comprising:

providing, in dependence on information units of the discrete-valued data, a stream of subsequent stream values such that the stream represents the discrete-valued data;

applying a phase rotation to a current stream value of the stream values representing the discrete valued data or to a current watermark symbol, the current watermark symbol corresponding to a current stream value of the stream values representing the discrete valued data, to acquire a current watermark coefficient of the watermark signal;

deriving a phase of a previous spectral coefficient of a watermarked signal which is a combination of a host signal and the watermark signal; and providing the watermark signal such that a phase angle of the phase rotation applied to the current stream value or to the current watermark symbol is dependent on the phase of the previous spectral coefficient of the watermarked signal;

wherein the host signal is an audio signal, an image signal or a video signal, and the watermarked signal is an audio signal, an image signal or a video signal, when the computer program runs on a computer.

14. A non-transitory digital storage medium comprising a computer program for performing the method for providing discrete-valued data in dependence on a watermarked signal, the method comprising:

providing a stream of complex-valued spectral coefficients, the stream representing the watermarked signal;

determining a phase angle difference between a previous complex valued spectral coefficient and a current complex-valued spectral coefficient;

mapping phase angle differences within at least two different phase angle ranges to a first discrete value of the discrete-valued data and mapping phase angle differences within at least another two different phase angle ranges to a second discrete value of the discrete valued data;

wherein adjacent phase angle ranges are mapped to different discrete values of the discrete-valued data; and wherein the watermarked signal is an audio signal, an image signal or a video signal, when the computer program runs on a computer.

* * * * *